US008201902B2

(12) United States Patent
Kusumoto

(10) Patent No.: US 8,201,902 B2
(45) Date of Patent: Jun. 19, 2012

(54) LIQUID DROPLET EJECTION APPARATUS, METHOD OF MANUFACTURING ELECTRO-OPTICAL APPARATUS, AND ELECTRO-OPTICAL APPARATUS

(75) Inventor: Hiroyuki Kusumoto, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1013 days.

(21) Appl. No.: 12/216,767

(22) Filed: Jul. 10, 2008

(65) Prior Publication Data

US 2009/0033700 A1 Feb. 5, 2009

(30) Foreign Application Priority Data

Aug. 2, 2007 (JP) ................................. 2007-202284

(51) Int. Cl.
*B41J 2/195* (2006.01)
(52) U.S. Cl. ...................... 347/7; 347/6; 347/19; 347/85
(58) Field of Classification Search .................. 347/6, 7, 347/14, 19, 35, 56, 67, 81, 84–87, 89
See application file for complete search history.

(56) References Cited

U.S. PATENT DOCUMENTS 5,880,748 A * 3/1999 Childers et al. .................. 347/6
6,158,850 A * 12/2000 Cook ............................... 347/85
6,164,766 A * 12/2000 Erickson ........................ 347/85

FOREIGN PATENT DOCUMENTS

| JP | A-11-42771 | 2/1999 |
| JP | A-2003-118135 | 4/2003 |
| JP | A-2003-118136 | 4/2003 |
| JP | A-2004-167365 | 6/2004 |
| JP | A-2006-1264 | 1/2006 |
| JP | A-2006-159073 | 6/2006 |

* cited by examiner

*Primary Examiner* — Thinh Nguyen
(74) *Attorney, Agent, or Firm* — Oliff & Berridge, PLC

(57) ABSTRACT

Provided herein is an inkjet type liquid droplet ejection apparatus which supplies functional liquid to a plurality of head units having one or more functional liquid droplet ejection heads, each of the head units is based on a supply unit, and which plots on a workpiece having: a tank unit which supplies the functional liquid continuously to the plurality of head units from a new functional liquid tank which is switched from an old functional liquid tank; a functional liquid supplying channel having a plurality of individual channels; a detecting device which detects whether the new functional liquid of the replaced functional liquid tank reaches to the branching unit; and a controller which controls the plurality of functional liquid droplet ejection heads individually, the controller controls each of the head units to make consumption amounts of the functional liquid equal to the maximum consumption amount of the functional liquid.

5 Claims, 27 Drawing Sheets

LIQUID DROPLET EJECTION APPARATUS, METHOD OF MANUFACTURING ELECTRO-OPTICAL APPARATUS, AND ELECTRO-OPTICAL APPARATUS

The entire disclosure of Japanese Patent Application No. 2007-202284, filed Aug. 2, 2007, is expressly incorporated by reference herein.

BACKGROUND

1. Technical Field

The present invention relates to a liquid droplet ejection apparatus of an inkjet type for plotting on a workpiece by a plurality of head units each of which has more than one functional liquid droplet ejection heads as a supply unit, with supplying functional liquid to the plurality of head units respectively, a method of manufacturing an electro-optical apparatus, and an electro-optical apparatus.

2. Related Art

A liquid droplet ejection apparatus is known as an inkjet printer corresponding to six colors which plots on a workpiece, except the liquid droplet ejection apparatus of the kind described above. The liquid droplet ejection apparatus has a functional liquid supplying apparatus which includes four inkjet heads per color, two intermediate ink packs per color supplying ink to the four inkjet heads per color, an ink cartridge per color replenishing functional liquid in the two intermediate ink packs per color, and tube units connecting these elements. JP-A-2003-118136 is an example of related art. Note that the ink cartridge is, so called, a main tank, which is replaced when a reduction of a liquid therein is detected.

However, in the inkjet printer described above, when the ink cartridge is replaced, timings at which a new ink arrives to respective inkjet heads are different each other because an ink consumption amount of each of the inkjet head is different according to a plotting pattern (print image). On the other hand, in a liquid droplet ejection apparatus of inkjet type used for manufacturing color filters or organic EL apparatuses, special functional liquid (inks) is used such as a filter material or a luminescent material and so on. When the functional liquid supplying apparatus above is incorporated in the liquid droplet ejection apparatus like this, some functional liquid droplet ejection heads eject old functional liquid whereas other functional liquid droplet ejection heads eject new functional liquid, thereby the plotting is performed on the workpiece with old and new functional liquid. In this case, there is a possibility that the plotting is performed with functional liquid of which production lots are different as the old and new functional liquid, that is, with functional liquid having different properties in viscosity and the like because of a problem regarding manufacturing of precision. In this case, a plotting quality for the workpiece to be plotted is deteriorated because of color heterogeneity or striations on the workpiece.

SUMMARY

An advantage of some aspects of the invention is that there is provided a liquid droplet ejection apparatus capable of restraining a plotting quality from being deteriorated when old functional liquid is replaced with new functional liquid resulting from a replacement of functional liquid tanks, a method of manufacturing electro-optical apparatus, and an electro-optical apparatus.

According to an embodiment of the invention, there is provided an inkjet type liquid droplet ejection apparatus which supplies functional liquid to a plurality of head units having one or more functional liquid droplet ejection heads, each of the head units is based on a supply unit, and which plots on a workpiece with the plurality of head units. The apparatus has: a tank unit which supplies the functional liquid continuously to the plurality of head units from a new functional liquid tank which is switched from an old functional liquid tank; a functional liquid supplying channel having a main channel of which upper stream side is connected to the tank unit, and a plurality of individual channels having same volume which is branched from the main channel by a branching unit and of which downstream side is connected to the plurality of head units; a detecting device which detects whether a new functional liquid from the new functional liquid tank reaches to the branching unit; and a controller which controls the plurality of functional liquid droplet ejection heads individually. The controller controls each of the head units at a time of non-plotting operation after the detecting device detects that the new functional liquid reaches to the branching unit so that all the head units except one head unit having a maximum consumption amount of the functional liquid perform a forcible ejection to make consumption amounts of the functional liquid thereof equal to the maximum consumption amount of the functional liquid.

With this configuration, it is possible to adjust arriving timings of the new functional liquid simultaneously in each of the head units by the forcible ejection with the controller after the new functional liquid reaches to the branching unit, so that the functional liquid consumption amounts in each of the head units are made to be the same as an amount of the head unit having the maximum functional liquid consumption amount. Therefore, when the functional liquid is introduced into a plurality of head units, the new and the old functional liquid can be shifted simultaneously, thereby the plotting process can be performed with the functional liquid of which attributes are the same. Consequently, it is possible to maintain the high plotting quality for the workpiece.

In this case, it is preferable that the old functional liquid tank and the new functional liquid tank are connected to the main channel via a tank channel switching device, the detecting device has a sensor which detects a switching of the tank channel switching device at a time of replacement of the old functional liquid tank with the new functional liquid tank and a timer which counts time frame from the switching detection by the sensor to the arriving of the new functional liquid to the branching unit.

With this configuration, it is possible to easily detect that the new functional liquid of the replaced (new) functional liquid tank reaches to the branching unit by the sensor and the timer.

In this case, it is preferable that the controller controls the plurality of head units individually based on a control table made by an experiment done in advance.

With this configuration, it is possible to easily perform the forcible ejection by referring the control table made by the experiment in advance, every time of halt of the plotting operation without having to detect a functional liquid consumption amount of each of the head units.

In this case, it is preferable that the controller has a rewriting device which rewrites data of the control table based on a plotting pattern on the workpiece.

With this configuration, it is possible to easily perform the forcible ejection corresponding to a plurality of plotting patterns by rewriting the control table so as to correspond to differences of the functional liquid consumption amount of each of the head units occurred by differences of the plotting patterns.

In this case, it is preferable that each of the head units has a plurality of functional liquid droplet ejection heads, and the apparatus further has a plurality of carriage units having each of the head units and a moving table moving the plurality of carriage units individually in a sub-scanning direction.

With this configuration, the plotting process is performed with the plurality of carriage units having the plurality of functional liquid droplet ejection heads supplied with functional liquid having the same attribute. Therefore, it is possible to form the workpiece with further high quality.

According to a further embodiment of the invention, there is provided a method of manufacturing an electro-optical apparatus, wherein a film formation portion may be formed on a workpiece by functional liquid droplets using the liquid droplet ejection apparatus.

According to a still further embodiment of the invention, there is provided an electro-optical apparatus in which a film formation portion is formed on a workpiece by functional liquid droplets using the liquid droplet ejection apparatus.

With this configuration, a high-quality electro-optical apparatus is efficiently manufactured. Note that, examples of functional material include, in addition to a light-emitting material (an light-emitting layer, and a hole-injecting layer) for organic EL (electro-luminescence) devices, filter material (filter elements) for color filters employed in liquid crystal display devices, fluorescent material (phosphor) for field emission display (FED) devices, fluorescent material (phosphor) for plasma display panel (PDP) devices, and electrophoretic material (electrophoresis) for electrophoretic display devices, which are allowed to be ejected from the functional liquid droplet ejection heads (inkjet heads). Furthermore, examples of the electro-optical apparatus (that is, flat panel display (FPD) devices) include an organic EL device, a liquid crystal display device, a field emission display device, a plasma display panel device, and an electrophoretic display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

A liquid droplet ejection apparatus employing functional liquid supplying apparatuses according to the invention will be described hereinafter with reference to the accompanying drawings. The liquid droplet ejection apparatus is used in a production line of a flat panel display device. For example, the liquid droplet ejection apparatus employs functional liquid droplet ejection heads using special ink or functional liquid such as luminescent resin liquid to form light-emitting elements serving as pixels of a color filter of a liquid crystal display device or an organic EL device.

Figure 1:
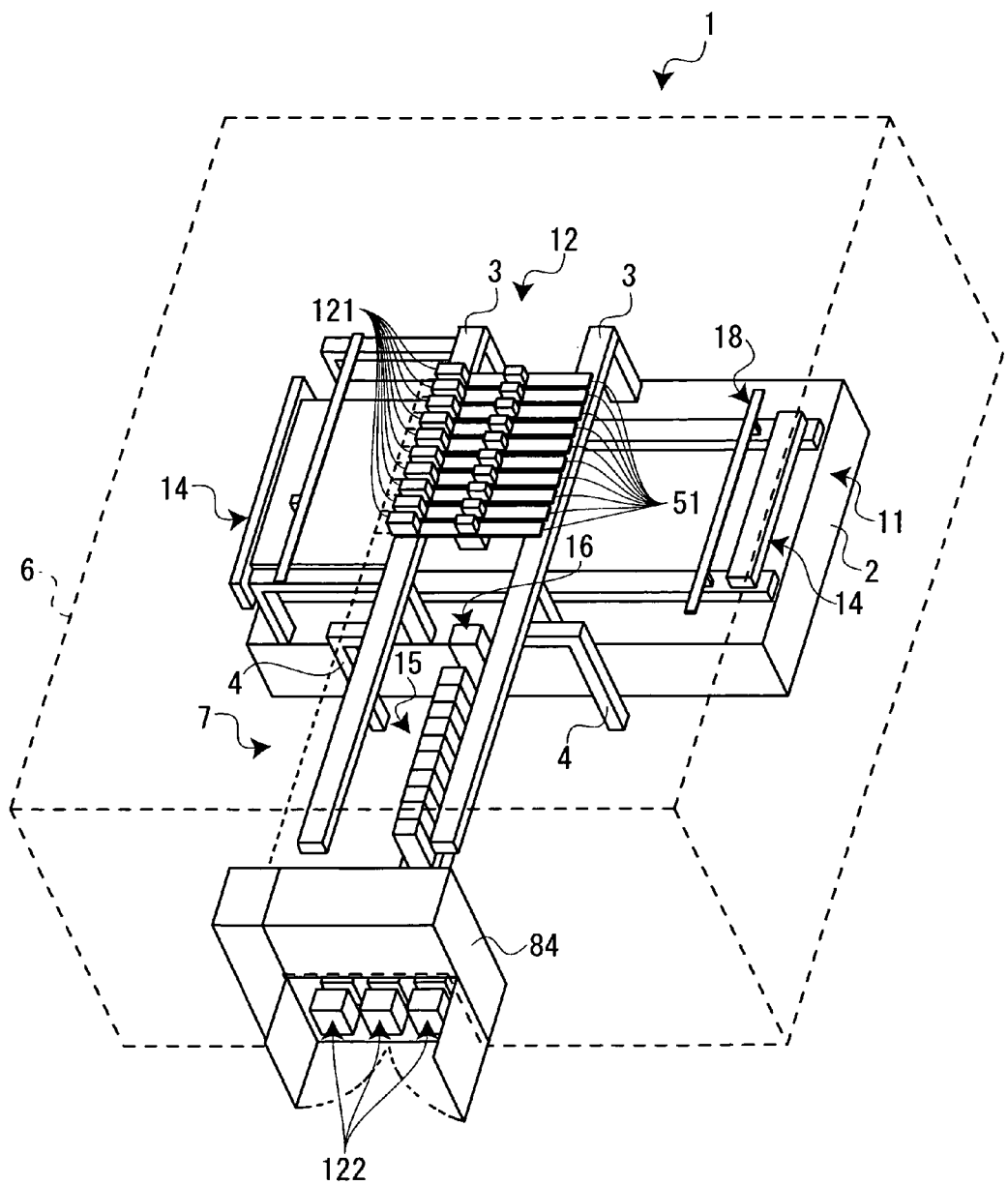
FIG. 1 is a perspective view illustrating a liquid droplet ejection apparatus according to an embodiment of the invention.
Figure 2:
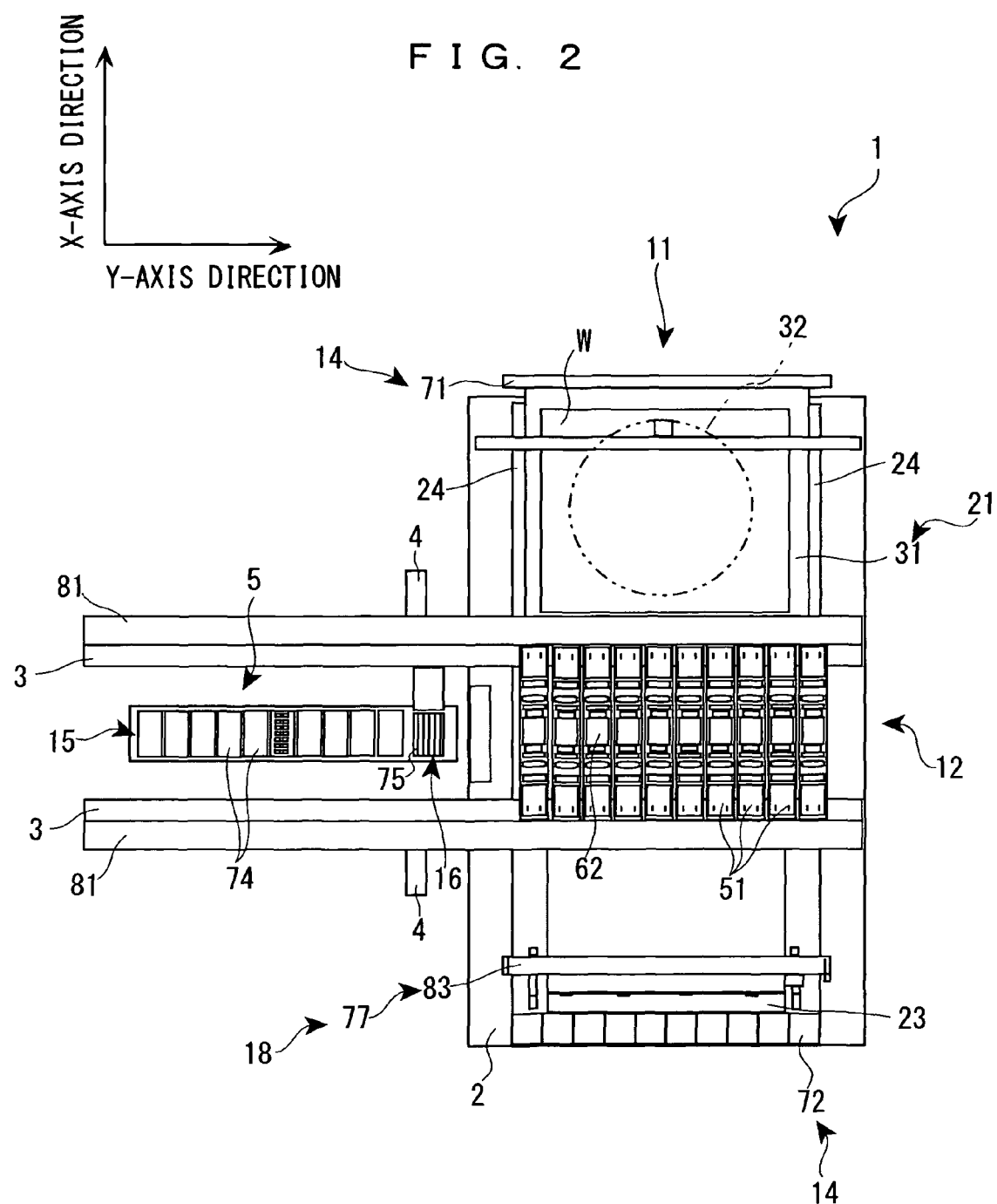
FIG. 2 is a plan view of the liquid droplet ejection apparatus.
Figure 3:
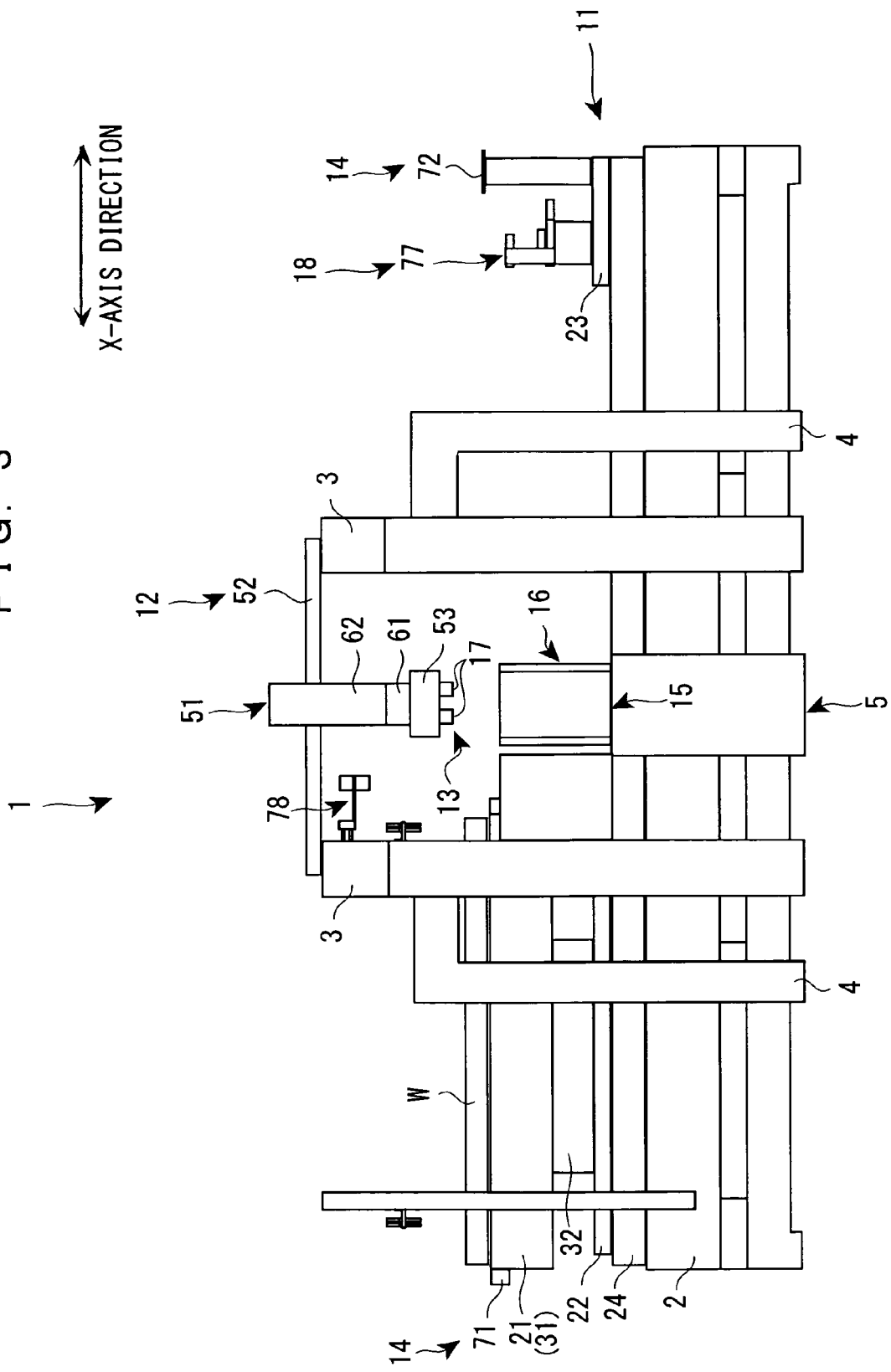
FIG. 3 is a side view of the liquid droplet ejection apparatus.

As shown in FIGS. 1, 2, and 3, a liquid droplet ejection apparatus 1 includes an X-axis table 11, a Y-axis table 12, and ten carriage units 51. The X-axis table 11 is disposed on an X-axis supporting base 2 mounted on a stone surface plate, extends in an X-axis direction which is a main scanning direction, and moves a workpiece W in the X-axis direction (main scanning direction). The Y-axis table 12 is disposed on a pair of (two) Y-axis supporting bases 3 which is arranged so as to stride across the X-axis table 11 using a plurality of poles 4, and extends in a Y-axis direction which is a sub-scanning direction. The ten carriage units 51 include a plurality of functional liquid droplet ejection heads 17 (not shown) mounted thereon, and are arranged so as to be hanged from the Y-axis table 12. The liquid droplet ejection apparatus 1 includes a chamber 6 which accommodates these components under the atmosphere of proper temperature and humidity and a functional liquid supplying unit 7 including three functional liquid supplying apparatuses 101 which supply functional liquid from the outside of the chamber 6 through the chamber 6 to the functional liquid droplet ejection heads 17 inside the chamber 6. The functional liquid droplet ejection heads 17 are driven to perform an ejection operation in synchronization with driving operations of the X-axis table 11 and the Y-axis table 12 whereby functional liquid droplets of three colors, R, G, and B are ejected and a predetermined plotting pattern is plotted on the workpiece W.

The liquid droplet ejection apparatus 1 further includes a maintenance unit 5 having a flushing unit 14, a suction unit 15, a wiping unit 16, and an ejection function inspection unit 18 which are used for maintenance of the functional liquid droplet ejection heads 17 so that functional maintenance and functional recovery of the functional liquid droplet ejection heads 17 are achieved. Note that, among the units included in the maintenance unit 5, the flushing unit 14 and the ejection function inspection unit 18 are mounted on the X-axis table 11, the suction unit 15 and the wiping unit 16 extend orthogonally to the X-axis table 11 and are disposed on a mounting portion located in a position in which the suction unit 15 and the wiping unit 16 do not disturb movement of the carriage units 51 moved using the Y-axis table 12. Note that, specifically, the ejection function inspection unit 18 has a stage unit 77 disposed on the X-axis table 11 and a camera unit 78 disposed on a Y-axis base 3, which will be described hereinafter.

The flushing unit 14 includes a pair of pre-plotting flushing units 71 and a periodic flushing unit 72, and receives functional liquid ejected from the functional liquid droplet ejection heads 17 at a time of pre-plotting flushing which is performed immediately before the functional liquid is ejected onto the workpiece W and which is performed when a plotting process is temporarily stopped, for example, during a replacement operation of the workpiece W. The suction unit 15 includes a plurality of divided suction units 74, forcedly sucks the functional liquid from ejection nozzles 98 of the functional liquid droplet ejection heads 17, and performs capping. The wiping unit 16 includes a wiping sheet 75 and wipes nozzle surfaces 97 of the functional liquid droplet ejection heads 17 after the sucking operation is performed. The ejection function inspection unit 18 includes the stage unit 77 and the camera unit 78, and inspects ejection functions (whether the ejection operation is properly performed and whether the functional liquid is ejected straight) of the functional liquid droplet ejection heads 17. The stage unit 77 includes an inspection sheet 83 mounted thereon which receives functional liquid droplets ejected from the functional liquid droplet ejection heads 17. The camera unit 78 is used to inspect the functional liquid droplets received using the stage unit 77 by recognizing an image.

Components of the liquid droplet ejection apparatus 1 will be described hereinafter. As shown in FIGS. 2 and 3, the X-axis table 11 includes a set table 21, an X-axis first slider 22, an X-axis second slider 23, a pair of right and left X-axis linear motors (not shown), and a pair of (two) X-axis common supporting bases 24. The set table 21 is used to set the workpiece W. The X-axis first slider 22 is used to support the set table 21 to slide in the X direction. The X-axis second slider 23 is used to support the flushing unit 14 and the stage unit 77 to slide in the X-axis direction. The pair of X-axis linear motors (not shown) extends in the X-axis direction, is used to move the set table 21 (workpiece W) in the X-axis direction through the X-axis first slider 22, and is used to move the flushing unit 14 and the stage unit 77 in the X-axis direction through the X-axis second slider 23. The pair of X-axis common supporting bases 24 is arranged so as to be parallel to the X-axis linear motors and guides the X-axis first slider 22 and the X-axis second slider 23.

The set table 21 includes a suction table 31 for attracting the workpiece W to be set thereon and a θ table 32 for correcting a position of the workpiece W set on the suction table 31 in a θ-axis direction. Furthermore, the pre-plotting flushing units 71 are additionally provided on a pair of sides of the set table 21 which is parallel to the Y-axis direction.

The Y-axis table 12 includes ten bridge plates 52 in which the ten carriage units 51 are hanged, respectively, and ten pairs of Y-axis sliders (not shown) which support the corresponding ten bridge plates 52 at both sides thereof. In addition, the Y-axis table 12 includes a pair of Y-axis linear motors (not shown) which are disposed on the pair of Y-axis supporting bases 3 and which are used to move the ten bridge plates 52 in the Y-axis direction through the ten pairs of Y-axis sliders. The Y-axis table 12 sub-scans the functional liquid droplet ejection heads 17 through each of the carriage units 51 at a time of the plotting process, and controls the functional liquid droplet ejection heads 17 to face the maintenance unit 5 (the suction unit 15 and the wiping unit 16).

When the pair of Y-axis linear motors is (simultaneously) driven, the Y-axis sliders simultaneously move in parallel to the Y-axis direction with the pair of Y-axis supporting bases 3 as guides. Therefore, the bridge plates 52 move in the Y-axis direction along with the carriage units 51. In this case, each of the carriage units 51 may independently move by drive-controlling the Y-axis linear motors, or the ten carriage units 51 may integrally move.

Cable supporting members 81 are disposed on the both sides of the Y-axis table 12 so as to be parallel to the Y-axis table 12. Each of the cable supporting members 81 has one end fixed to the Y-axis base 3 and the other end fixed to one of the corresponding bridge plates 52. Each of the cable supporting members 81 accommodates cables, air tubes and functional liquid channel (ten branch channels 133 which will be described hereinafter) for each of the carriage units 51.

Figure 4:
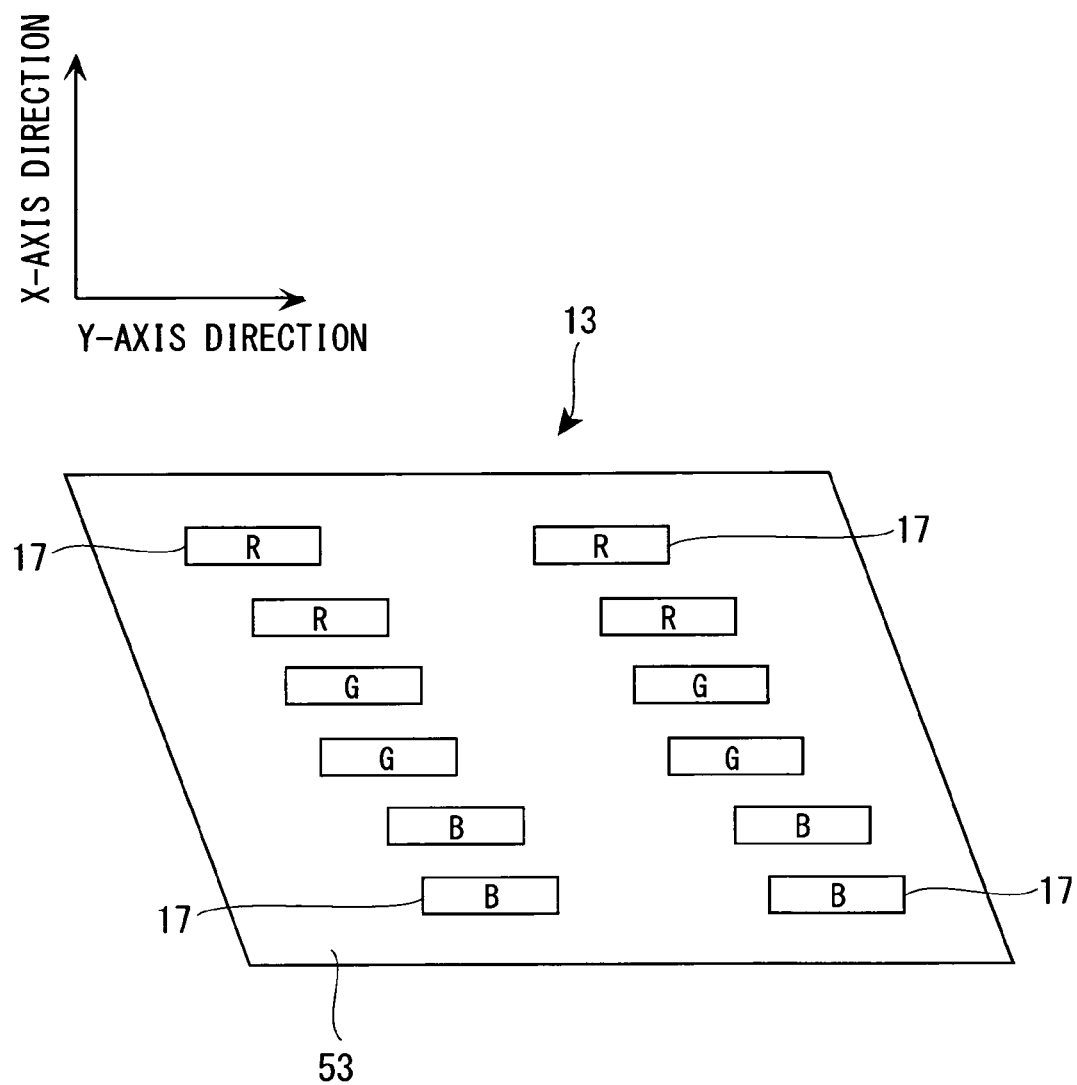
FIG. 4 is a diagram illustrating functional liquid droplet ejection heads including head groups.

Each of the carriage units 51 includes a head unit 13 having twelve functional liquid droplet ejection heads 17 and a head plate 53 in which the twelve functional liquid droplet ejection heads 17 are arranged thereon so as to be divided into two groups each of which has six functional liquid droplet ejection heads 17 (refer to FIG. 4). Furthermore, each of the carriage units 51 has a θ rotation mechanism 61 which supports the head unit 13 so that the head unit 13 is subjected to θ correction (θ rotation), and a hanging member 62 which supports the head unit 13 on the Y-axis table 12 (a corresponding one of the bridge plates 52). In addition, sub-tanks 121 described later are disposed on the respective carriage units 51 (specifically, the sub-tanks 121 are disposed on the bridge plates 52), and functional liquid is supplied from the sub-tanks 121 to the functional liquid droplet ejection heads 17 by natural hydraulic head.

Figure 5:
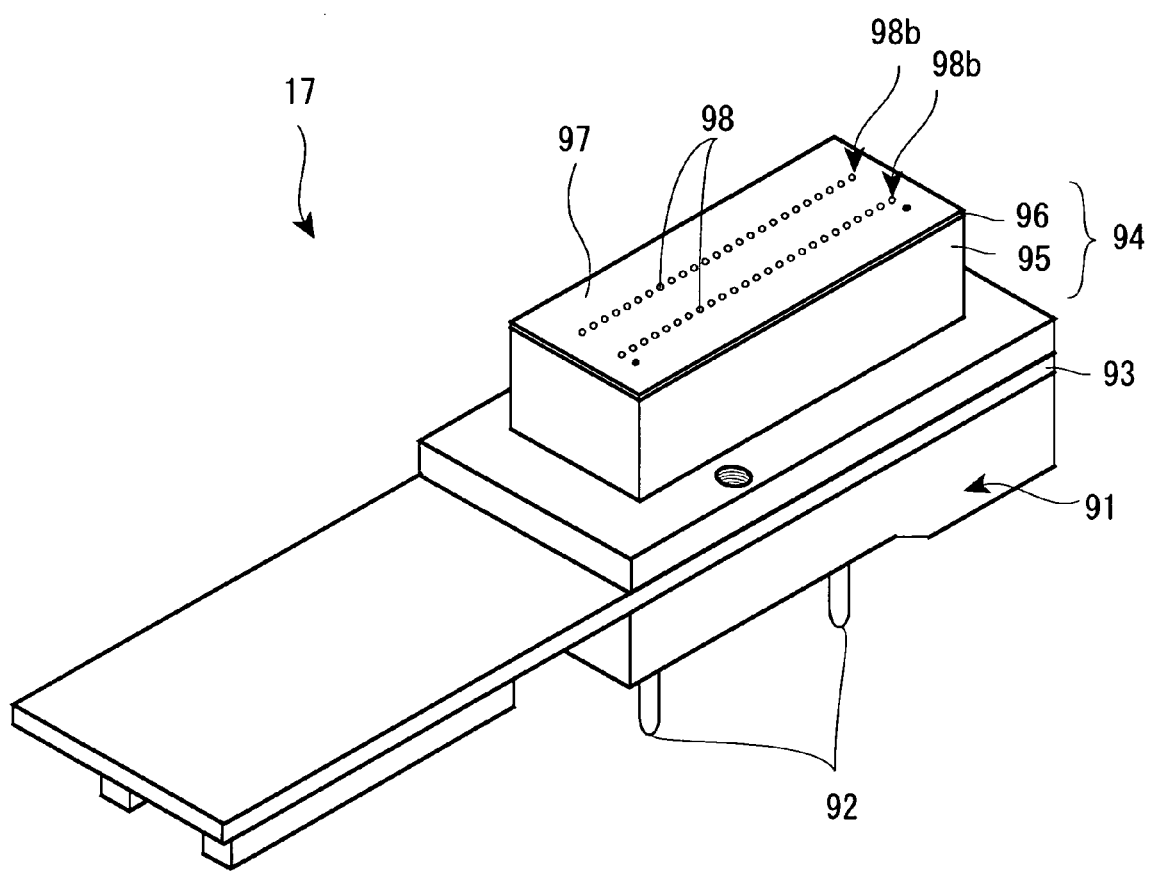
FIG. 5 is a perspective view of an appearance of one of the functional liquid droplet ejection heads.

As shown in FIG. 5, each of the functional liquid droplet ejection heads 17 is a so-called twin-type head, and includes a functional liquid introduction unit 91 having twin connecting needles 92, twin head boards 93 continuing from the functional liquid introduction unit 91, and a head body 94 continuing downward from the functional liquid introduction unit 91 and being formed with an in-head flow channel filled with the functional liquid therein. The connecting needles 92 are connected to the functional liquid supplying unit 7 (the functional liquid supplying apparatuses 101) and supply the functional liquid to the functional liquid introduction unit 91. The head body 94 includes a cavity 95 (piezoelectric element), and a nozzle plate 96 having a nozzle surface 97 provided with a number of ejection nozzles 98 opening therethrough. When the functional liquid droplet ejection heads 17 are driven for ejection, (a voltage is applied to the piezoelectric element) functional liquid droplets are ejected from the ejection nozzles 98 by a pumping action of the cavities 95.

A number of ejection nozzles 98 formed on the nozzle surface 97 are divided into two split nozzle rows 98b which are arranged in parallel to each other. The two split nozzle rows 98b are arranged so as to be displaced by a half pitch from each other.

The temperature and humidity in the chamber 6 are kept constant. That is, the liquid droplet ejection apparatus 1 performs the plotting process on the workpiece W under an atmosphere of fixed temperature and humidity. A tank cabinet 84 which accommodates a tank unit 122 (which will be described hereinafter) and the like is disposed on a portion of one of side walls of the chamber 6. Note that, when an organic EL device, for example, is manufactured, the chamber 6 is preferably filled with inert gas (nitrogen gas) as an atmosphere.

Figure 6:
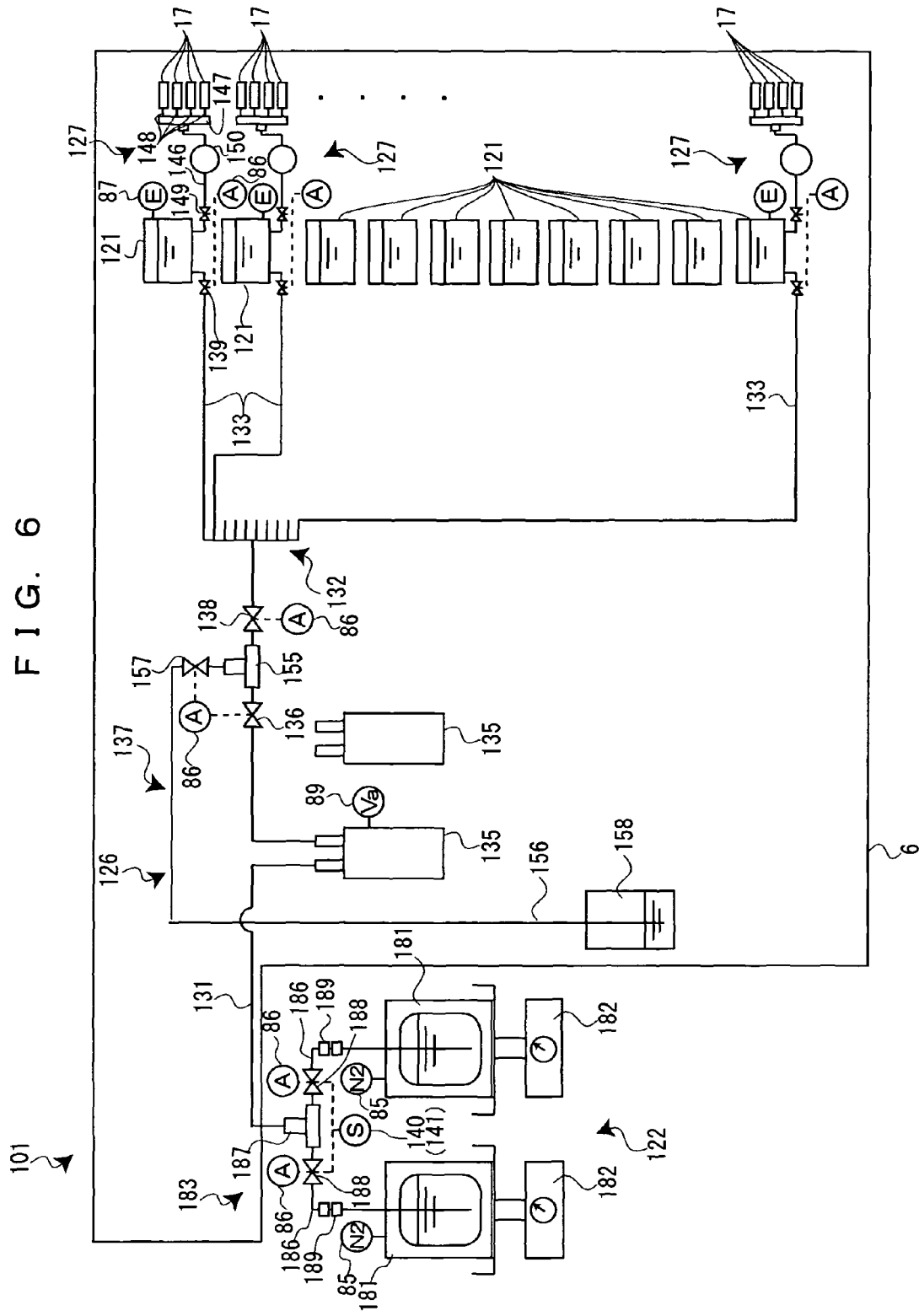
FIG. 6 is a diagram illustrating a channel system of a functional liquid supplying apparatus.

Referring now to FIG. 1 and FIG. 6, the functional liquid supplying unit 7 will be described. The functional liquid supplying unit 7 includes the three functional liquid supplying apparatuses 101 for three colors, that is, R, G, and B. The functional liquid supplying unit 7 further includes nitrogen gas supplying units 85 which supply compression nitrogen gas to control the main tank 181 described later and the like, compression air supplying units 86 which supply compression air used to control various valves, gas exhaust units 87 which are used to exhaust gas from various units, and a vacuuming unit 89 connected to a bubble removing unit 135 described later. The three functional liquid supplying apparatuses 101 are connected to the functional liquid droplet ejection heads 17 corresponding to the three colors R, G, and B, and supply functional liquid of corresponding colors to the functional liquid droplet ejection heads 17.

As shown in FIG. 6, each of the functional liquid supplying apparatuses 101 includes a tank unit 122 including two main tanks 181 which are supply sources of functional liquid, the ten sub-tanks 121 corresponding to each of the carriage units 51, a functional liquid upstream channel 126 which is used to connect the tank unit 122 to ten of the sub-tanks 121, and ten functional liquid downstream channels 127 which are used to connect each of the sub-tanks 121 to each of the functional liquid droplet ejection heads 17.

The functional liquid included in the main tank 181 is compressed by compression nitrogen gas supplied from one of the nitrogen gas supplying units 85 which is connected to the main tank 181 and is selectively supplied to the ten sub-tanks 121 through the functional liquid upstream channel 126. When the functional liquid is supplied from the main tank 181, the various valves are controlled to be opened or closed using compression air supplied from the compression air supplying units 86. Simultaneously, each of the sub-tanks 121 are opened to the atmosphere through the gas exhaust units 87. Accordingly, a required amount of functional liquid is supplied to each of the sub-tanks 121. The functional liquid supplied to each of the sub-tanks 121 is further supplied to the functional liquid droplet ejection heads 17 connected to the sub-tanks 121 through the functional liquid downstream channels 127 while a predetermined hydraulic head pressure is maintained by driving the functional liquid droplet ejection heads 17 connected to the sub-tanks 121.

The tank unit 122 includes a pair of the main tanks 181 which is a supply source of the functional liquid, a pair of weight measurement units 182 which measures the weight of the pair of the main tanks 181, and a switching mechanism (a tank channel switching device) 183 which is connected to the pair of main tanks 181 and the functional liquid upstream channel 126. Each of the main tanks 181 is connected to the nitrogen gas supplying units 85 and is subjected to pressure control when supplying the functional liquid by applying a pressure.

The switching mechanism 183 has a pair of tank channels 186 connected to the pair of the main tanks 181, a tank joint 187 of which the upstream side is connected to the pair of tank channels 186 and of which the downstream side is connected to the functional liquid upstream channel 126, and tank opening/closing valves 188 each of which is disposed in each of the tank channels 186. By opening one of the tank opening/closing valves 188 and closing the other, a connection to the functional liquid upstream channel 126 is switched between the pair of main tanks 181 alternatively.

The weight measurement unit 182 is a loadcell, for example. When the functional liquid included in the main tank 181 is used and therefore the weight thereof is reduced to a predetermined weight, the weight measurement unit 182 notifies a user of necessity of replacement of the main tank 181. Each of the tank channels 186 is provided with a bubble detecting sensor 189 (composed of two optical sensors). After one of the main tanks 181 is weighed to the predetermined weight and the bubble detecting sensor 189 detects bubbles, a channel is switched to the other main tank 181 (automatically or manually). Note that instead of the weight measurement unit 182, a liquid-level sensor or the bubble detecting sensor may be provided to issue an alert.

Thus, the tank unit 122 has the pair of main tanks 181 and when one of the main tanks 181 is detected that it needs to be replaced, the connection to one of the main tanks 181 is switched to the other of the main tanks 181, thereby, the latter continues to supply. In the meantime, the main tank 181 needed to be replaced is replaced, and the tank unit 122 can continue to supply the functional liquid without halting an operation by the liquid droplet ejection apparatus. Note that the functional liquid supplied from the main tank 181 before switching is referred to as old functional liquid and the functional liquid supplied from the main tank 181 after switching is referred to as new functional liquid hereinafter.

The functional liquid upstream channel 126 includes, from the upstream side, a main channel 131 of which the upstream side is connected to the tank unit 122, and ten branch channels 133 which are divided into ten channels from the main channel 131 via a branching unit 132 and of which downstream side are connected to respective sub-tanks 121. The functional liquid supplied from the tank unit 122 is branched into ten channels by the branching unit 132 and supplied to each of the sub-tanks 121. Note that an individual channel in claims includes branch channels 133, the sub-tanks 121 and the functional liquid downstream channels 127, and a functional liquid supplying channel includes the functional liquid upstream channel 126, ten sub-tanks 121 and ten functional liquid downstream channels 127.

In the main channel 131, from the upstream side, a bubble elimination unit 135, a first opening/closing valve 136, an air-drawn unit 137, and a second opening/closing valve 138 are provided respectively. Further, in each of the branch channels 133, a third opening/closing valve 139 is provided, which is adjacent to each of the sub tanks 121. In addition, an arriving detection device (a detection device) 140 is provided, which detects that the new functional liquid arrives to the branching unit 132 after the main tanks 181 are switched.

In each of the functional liquid downstream channels 127, from the upstream side, a head-side main channel 146 of which the upstream side is connected to the corresponding sub-tank 121, a four-branched channel 147 of which the upstream side is connected to the head-side main channel 146, and a plurality of head-side branched channels 148 of which the upstream side are connected to the four-branched channel 147. With this configuration, the functional liquid is supplied to four channels from each of the sub-tanks 121 and further supplied to the functional liquid droplet ejection heads 17. Specifically, since the functional liquid is divided into the ten streams in the functional liquid upstream channel 126 and each of the ten streams is further divided into four streams in the functional liquid downstream channels 127, the functional liquid is supplied to 10×4 functional liquid droplet ejection heads 17. In addition, since the functional liquid supplying unit 7 has the three functional liquid supplying apparatuses 101 corresponding to R, G, and B, the functional liquid is supplied to 10×12 functional liquid droplet ejection heads 17. Note that, in the head-side main channel 146, a fourth opening/closing valve 149 and a pressure reducing valve 150 are arranged.

The vacuuming unit 89 is connected to the bubble removing unit 135. The bubble removing unit 135 brings an inner channel separated using a gas permeable film into a vacuum state and allows bubbles included in the functional liquid in the inner channel to transmit through the gas permeable film whereby the bubbles are removed. Note that since the bubble removing unit 135 is an expendable component, a spare bubble removing unit 135 is preferably provided as shown in FIG. 6 so that the bubble removing unit 135 is immediately replaced to the spare bubble removing unit 135.

The air releasing unit 137 includes an air releasing joint 155 disposed in the main channel 131, an air releasing valve 157 having a opening/closing valve and a bubble sensor, an air releasing channel 156 connected to the air releasing valve 157, and a liquid storage tank 158 disposed at the downstream end of the air releasing channel 156. The air releasing unit 137 is used to initially fill the functional liquid into the functional liquid supplying apparatuses 101. When the functional liquid is supplied from the main tank 181, the air releasing valve 157 is opened and the second valve 138 is closed so that the air included in the main channel 131 is discharged. Then, when the air releasing valve 157 detects bubbles, (after a while) the air releasing valve 157 is closed and the second valve 138 is opened. Air releasing processing is thus terminated. Note that three liquid storage tanks 158 corresponding to each of the colors may be provided when the functional liquid in the liquid storage tanks 158 is recycled, whereas only one liquid storage tank 158 may be provided when the functional liquid is not recycled.

The arriving detection device (the detection device) 140 includes a sensor 141 which detects a switching of the pair of tank opening/closing valves 188 of the switching mechanism 183, and a timer (an internal clock of a controller 197 described later) which counts time frame from the switching detection by the sensor 141 to the arriving of the functional liquid to the branching unit 132. An arriving time from the tank opening/closing valves 188 to the branching unit 132 is preliminary measured, and the new functional liquid is supposed to arrive to the branching unit 132 when a predetermined time passes after the detection by the sensor 141.

Pressure reducing valves 150 operate in accordance with an atmospheric pressure, and are used to maintain hydraulic head values between the pressure reducing valve 150 and the corresponding functional liquid droplet ejection heads 17 within a predetermined allowable range. Use of the pressure reducing valve 150 enables hydraulic head values of the functional liquid at nozzle surfaces 97 of the functional liquid droplet ejection heads 17 to be accurately maintained.

The sub-tank 121 supplies the functional liquid to each of the four functional liquid droplet ejection heads 17. The sub-tank 121 has a liquid level detection mechanism which detects a liquid level of the functional liquid stored in the sub-tank 121 and maintains the liquid level of the functional liquid at a predetermined height. When the functional liquid droplet ejection head 17 is operated for ejection and the liquid level of the functional liquid lowers to a lower limit (in a reduced liquid state), the opened third valves 139 are opened and the main tank 181 supplies the functional liquid. On the other hand, when the liquid level of the functional liquid rises up to an upper limit by the supply from the main tank 181, the third valves 139 are closed and the main tank 181 stops supplying of the functional liquid.

Figure 7:
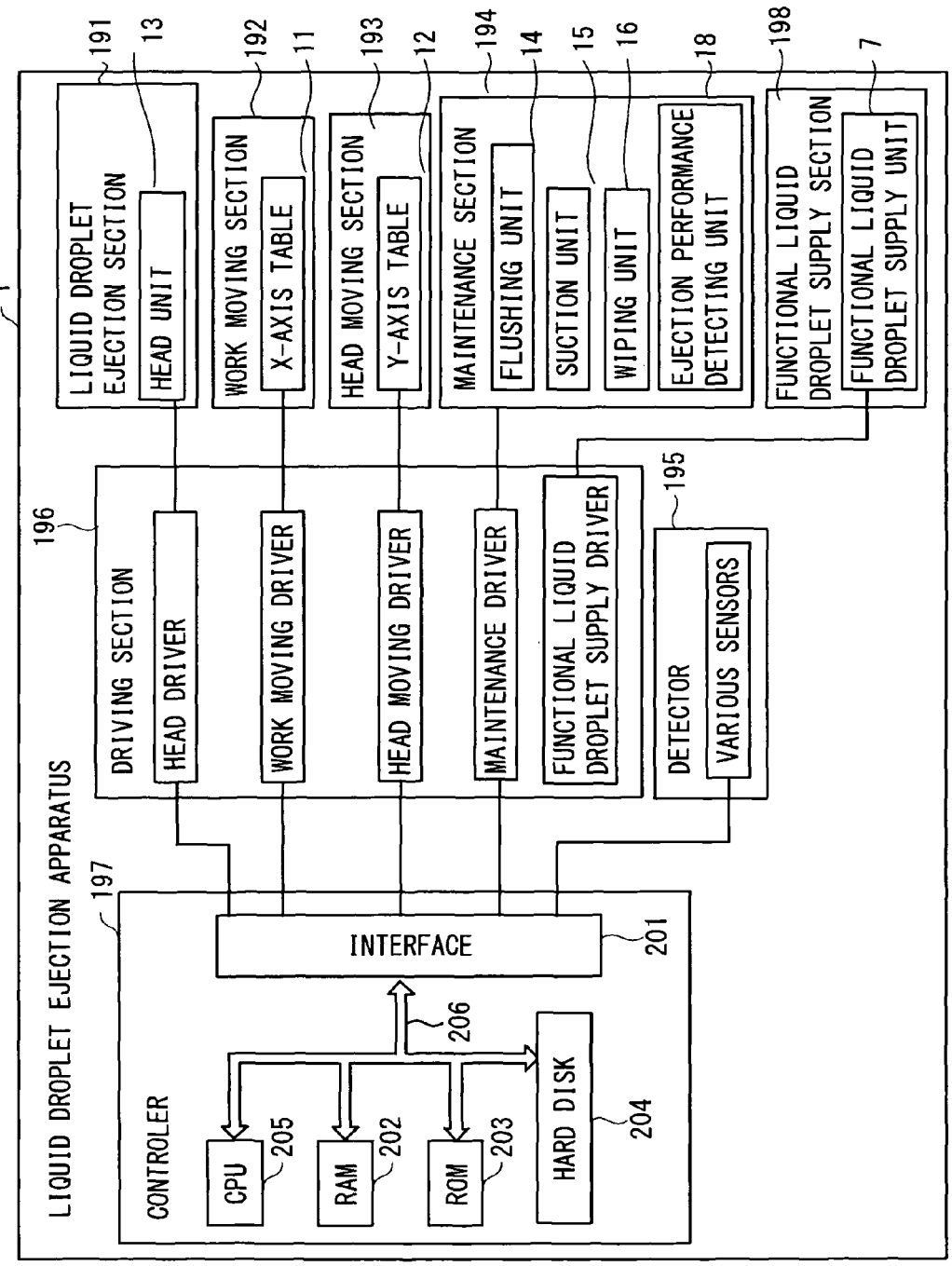
FIG. 7 is a block diagram explaining a main control system of the liquid droplet ejection apparatus.

Referring to FIG. 7, a main control system of the liquid droplet ejection apparatus 1 will be described. As shown in FIG. 7, the liquid droplet ejection apparatus 1 includes a liquid droplet ejection section 191, a workpiece moving section 192, a head moving section 193, a maintenance section 194, a function liquid supply section 198, a detector 195, a driving section 196, and a controller 197 (control device). The liquid droplet ejection section 191 includes the head unit 13 (the functional liquid droplet ejection heads 17). The workpiece moving section 192 includes the X-axis table 11 and is used to move the workpiece W in the X-axis direction. The head moving section 193 includes the Y-axis table 12 and is used to move the head unit 13 in the Y-axis direction. The maintenance section 194 includes units used for maintenance. The functional liquid supply section 198 includes the functional liquid supply unit 7 and supplies the functional liquid to the functional liquid droplet ejection heads 17. The detector 195 includes various sensors used for various detection operations. The driving section 196 includes various drivers which control and drive these individual sections. The controller 197 is connected to the individual sections and entirely controls the liquid droplet ejection apparatus 1.

The controller 197 includes various components such as an interface 201, a RAM 202, a ROM 203, a hard disk 204, a CPU 205, and a bus 206. The interface 201 is used to connect the various sections to each other. The RAM 202 has a storage area capable of storing data temporarily and is used as a workspace for control processing. The ROM 203 has various storage areas and is used to store control programs and control data. The hard disk 204 stores plotted data used when a predetermined plotting pattern is plotted on the workpiece W and a variety of data transmitted from the various sections, and further stores programs used for processing the variety of data. The CPU 205 performs calculation processing for the variety of data in accordance with the programs stored in the ROM 203 and the hard disk 204. The bus 206 is used to connect the components to each other.

The controller 197 is used to input the variety of data transmitted from the various sections through the interface 201 and allows the CPU 205 to perform the calculation processing in accordance with the programs stored in the hard disk 204 (or in accordance with the programs read sequentially from the ROM 203 using a CD-ROM drive, for example). A result of the calculation processing is output to the sections through the driving section 196 (the various drivers). Thus, the liquid droplet ejection apparatus 1 is entirely controlled and various processes of the liquid droplet ejection apparatus 1 are performed.

A functional liquid supply operation to the functional liquid droplet ejection heads 17 will be explained. In this operation, the functional liquid is stored in each of the main tanks 181 and each of the sub tanks 121, and the operation is performed in a state that the functional liquid is filled in each of the channels. Additionally, one of the main tanks 181 connected to the functional liquid upstream channel 126 is pressurized by the nitrogen gas supply unit 85.

With a state in which the third opening/closing valve 139 provided in the upstream side of the sub tank 121 is closed, the functional liquid droplet ejection heads 17 are driven to eject the functional liquid droplets. As the third opening/closing valve 139 is closed, the pressure from the main tank 181 is freed and the functional liquid is fed from each of the sub tanks 121 to each of the functional liquid droplet ejection heads 17 with a pumping action of the functional liquid droplet ejection heads 17. Note that the hydraulic head value at the nozzle surface 97 of the functional liquid droplet ejection head 17 is in a final adjustment by the pressure reducing valve 150 provided in the functional liquid downstream channels 127.

A replenishment of the functional liquid to the sub-tanks 121 will be explained. When a certain amount of the functional liquid in the sub-tanks 121 decreases to a certain amount by the ejecting process of the functional liquid droplet ejection heads 17, a decreased liquid state is detected. In a case where the decreased liquid state is detected, the functional liquid is replenished from the main tank 181 to the sub-tanks 121 through the opening of the third opening/closing valves 139. As the main tank 181 is pressurized, the functional liquid in the main tank 181 is fed to the sub-tanks 121 automatically by opening the third opening/closing valves 139. Note that, in this case, the ejecting process of the functional liquid droplet ejection heads 17 continues.

When the functional liquid is fed from the main tank 181 to the sub tanks 121, and is stored in the sub tanks 121 with a certain amount, the full liquid state in the sub tanks 121 is detected. As the full liquid state is detected, the third opening/closing valves 139 are closed to complete the replenishment operation.

A handling operation at the time of no functional liquid in the main tank 181 connected to the functional liquid upstream channel 126 will be explained. As the replenishment operation to the sub-tanks 121 is repeated, the functional liquid in the main tank 181 decreases and it is detected by the weight measuring apparatus 182 that the main tank 181 needs to be replaced. When it is determined that the main tank 181 needs to be replaced, the switching mechanism 183 switches the connection with the functional liquid upstream channel 126 to one of the main tanks 181 (which is in the full liquid state) from the other of the main tanks 181 which needs to be replaced (supply switching). Then, the new functional liquid of the main tank 181 is operated to replenish to the sub-tanks 121.

Figure 8:
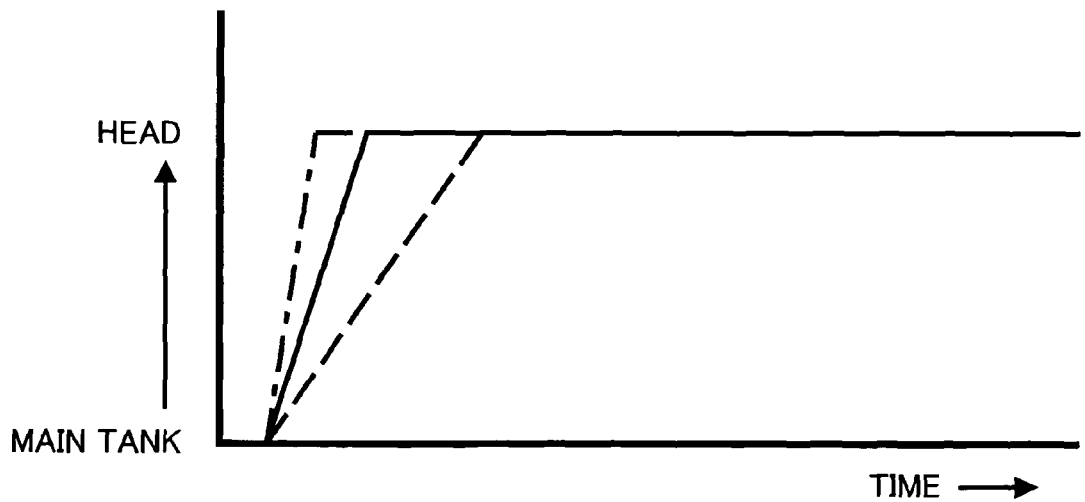
FIG. 8 is a graph illustrating differences in arriving timings of a new functional liquid to respective head units upon replacing main tanks.
Figure 9A:
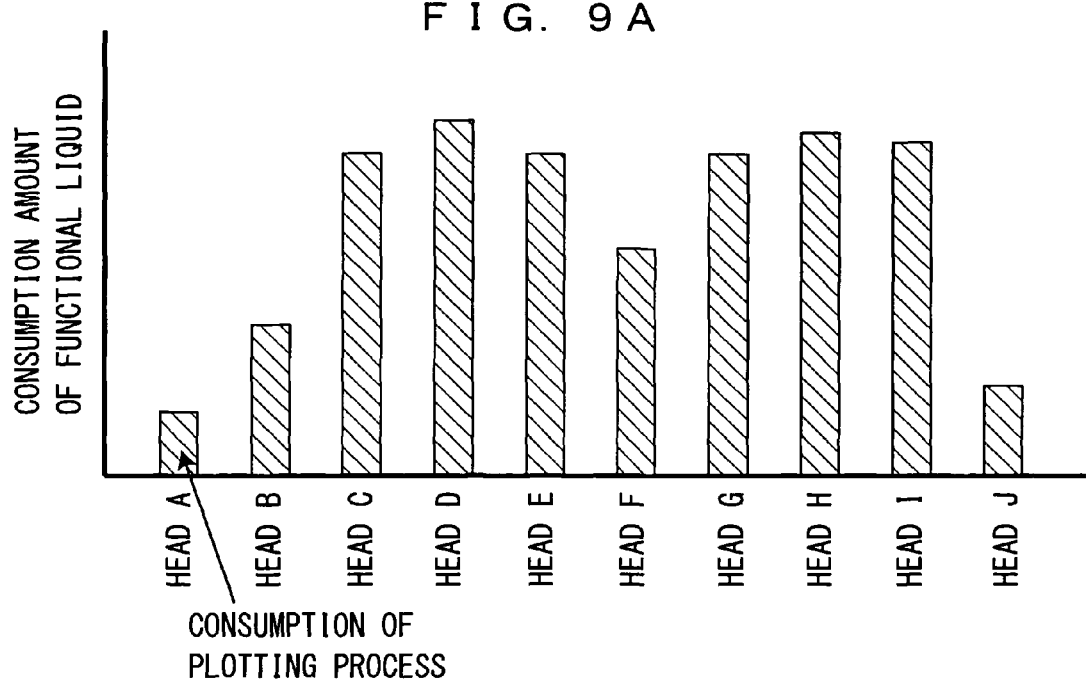
FIGS. 9A and 9B are graphs illustrating adjustments for functional liquid consumption amount by forcible ejection.

When the supply switching to one of the main tanks 181 is performed, time difference for arriving the new functional liquid occurs between head units 13 which consume more functional liquid per plotting process and head units 13 which consume less functional liquid per plotting process (refer to FIGS. 8 and 9A). A handling operation by each of the head units 13 will be explained hereinbelow to solve such a disadvantage.

Figure 9B:
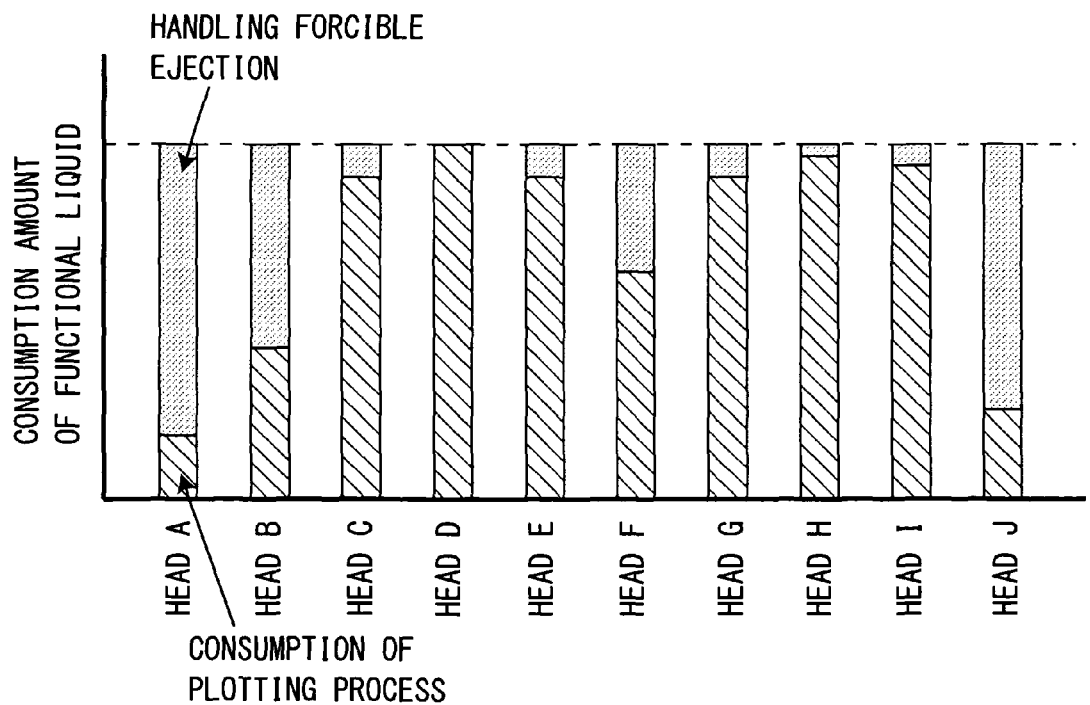

When the main tanks 181 are switched for supplying the functional liquid and the new functional liquid is reached at the branching unit 132, the arriving detection device 140 detects the arrival of the new functional liquid. After the detection, a handling forcible ejection is performed so as to adjust arriving timings of the new functional liquid simultaneously among each of the head units 13 every time the plotting operation is performed, in addition to a normal forcible ejection for maintenance in a plotting halt state. In other words, in the handling forcible ejection, the forcible ejection is performed at head units 13 with the functional liquid difference with respect to the head unit 13 having a maximum amount of consumed functional liquid for one plotting operation (including a consumption amount of the functional liquid) so as to make the functional liquid consumption amounts same among each of the head units 13 (refer to FIG. 9B). Thus, by ejecting forcibly from each of the head units 13 so as to make the functional liquid consumption amounts equal among each of the head units 13 every time the plotting operation halts, it is possible to adjust the arriving timings for the new functional liquid simultaneously in each of the head units 13. Therefore, when a plurality of head units 13 are introduced with the functional liquid, the new and the old functional liquid are shifted in respective head units 13, and it is possible to perform the plotting process with the functional liquid of which attributes are always the same. Consequently, it is possible to maintain a high plotting quality for the workpiece W. Note that the handling forcible ejection is performed till the new functional liquid is arrived at each of the head units 13 (till the time when the new functional liquid is supposed to arrive).

The handling forcible ejection of each of the head units 13 is done based on a control table stored in the controller 197 (more specifically, in the ROM 203 or the hard disk 204). It is possible to measure the functional liquid consumption amount of each of the head units 13 per plotting process and controls the handling forcible ejection of each of the head units 13 based on the measurement result, but, in the preferred embodiment, the handling forcible ejection of each of the head units 13 is controlled based on the control table made by an experiment done in advance. It is not necessary to detect the functional liquid consumption amount of each of the head units 13 per plotting process or halt of plotting process and it is possible to easily perform the handling forcible ejection of each of the head units 13.

The functional liquid consumption amounts of a plurality of head units 13 in a plotting process differs from one another based on plotting patterns to be used for the plotting processes. Therefore, the controller 197 rewrites the control table based on the plotting pattern (print image). In other words, it is possible to easily switch channels corresponding to a plurality of plotting patterns so as to respond to the plotting pattern used for the plotting process by rewriting the control table corresponding to the plotting pattern. Note that a rewriting device in claims has the controller 197 as described above.

According to the structure above, it is possible to adjust arriving timings of the new functional liquid simultaneously in each of the head units 13 by the forcible ejection with the controller 197 so that the functional liquid consumption amounts in each of the head units 13 are made to be the same as the head unit 13 having the maximum functional liquid consumption amount. Therefore, when the functional liquid is introduced into a plurality of head units 13, the new and the old functional liquid can be shifted simultaneously, whereby the plotting process can be performed with the functional liquid of which attributes are the same. Consequently, it is possible to maintain the high plotting quality for the workpiece W.

In the preferred embodiment, the liquid droplet ejection apparatus 1 having ten carriage units 51 is used, but the number of carriage units 51 is optional.

Taking electro-optical apparatuses (flat panel display apparatuses) manufactured using the liquid droplet ejection apparatus 1 and active matrix substrates formed on the electro-optical apparatuses as display apparatuses as examples, configurations and manufacturing methods thereof will now be described. Examples of the electro-optical apparatuses include a color filter, a liquid crystal display apparatus, an organic EL apparatus, a plasma display apparatus (PDP (plasma display panel) apparatus), and an electron emission apparatus (FED (field emission display) apparatus and SED (surface-conduction electron emitter display) apparatus). Note that the active matrix substrate includes thin-film transistors, source lines and data lines which are electrically connected to the thin film transistors.

Figure 10:
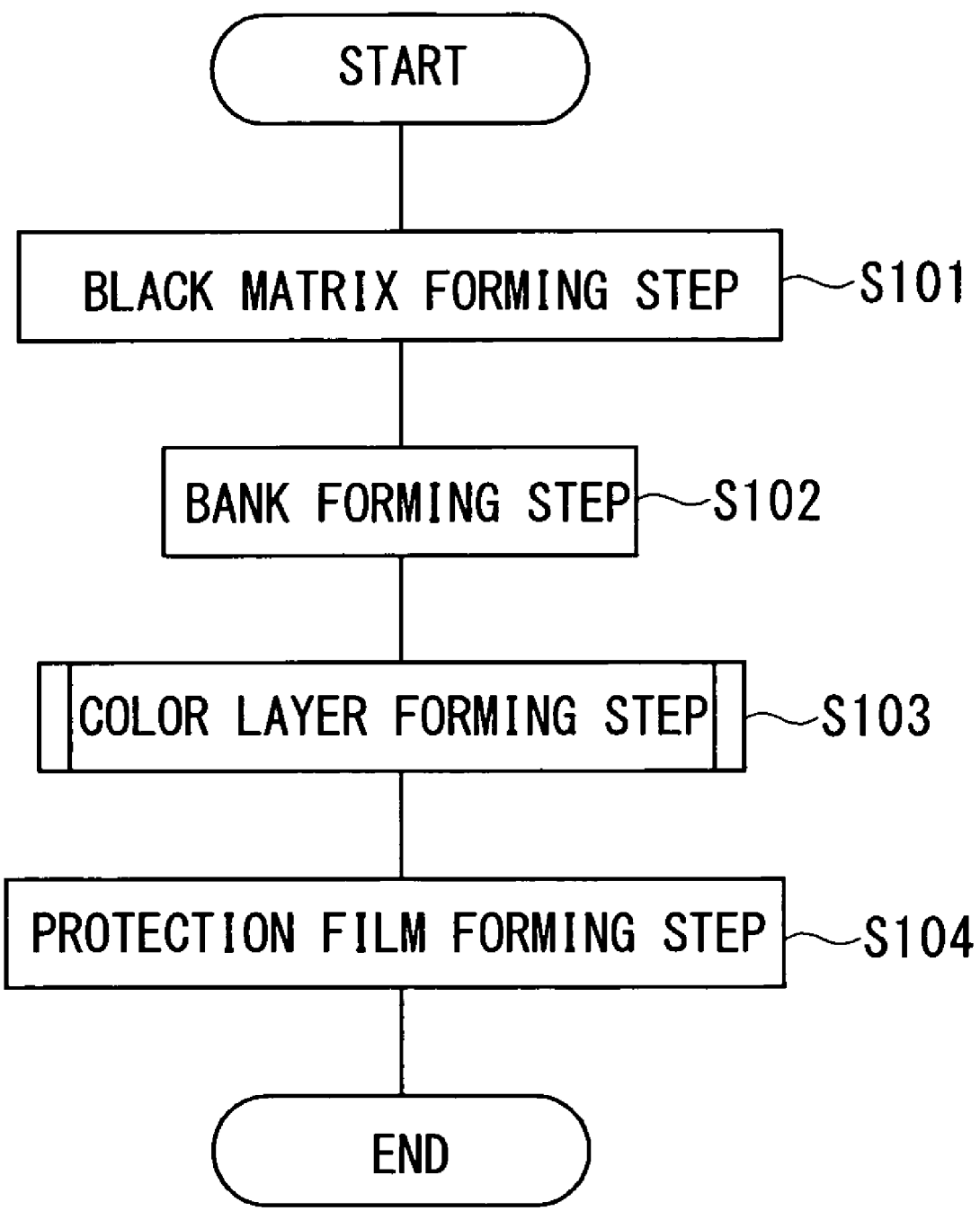
FIG. 10 is a flow chart illustrating manufacturing steps of the color filter.

First, a manufacturing method of a color filter incorporated in a liquid crystal display apparatus or an organic EL apparatus will be described. FIG. 10 shows a flowchart illustrating manufacturing steps of a color filter. FIGS. 11A to 11E are sectional views of the color filter 500 (a filter substrate 500A) of this embodiment shown in an order of the manufacturing steps.

Figure 11A:
FIGS. 11A to 11E are sectional views schematically illustrating the color filter showing in an order of manufacturing steps.

In a black matrix forming step (step S101), as shown in FIG. 11A, a black matrix 502 is formed on the substrate (W) 501. The black matrix 502 is formed of a chromium metal, a laminated body of a chromium metal and a chromium oxide, or a resin black, for example. The black matrix 502 may be formed of a thin metal film by a sputtering method or a vapor deposition method. Alternatively, the black matrix 502 may be formed of a thin resin film by a gravure plotting method, a photoresist method, or a thermal transfer method.

Figure 11B:
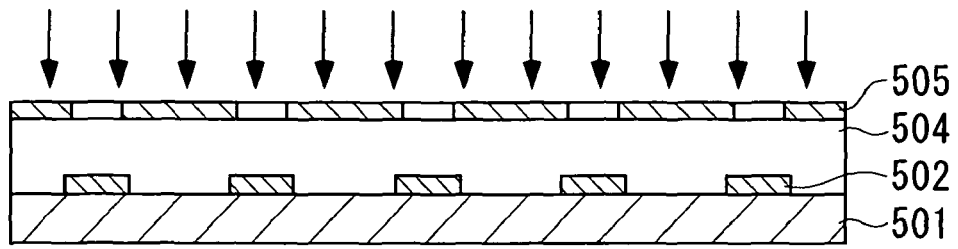

In a bank forming step (step S102), the bank 503 is formed so as to be superposed on the black matrix 502. Specifically, as shown in FIG. 11B, a resist layer 504 which is formed of a transparent negative photosensitive resin is formed so as to cover the substrate 501 and the black matrix 502. An upper surface of the resist layer 504 is covered with a mask film 505 formed in a matrix pattern. In this state, exposure processing is performed.

Figure 11C:
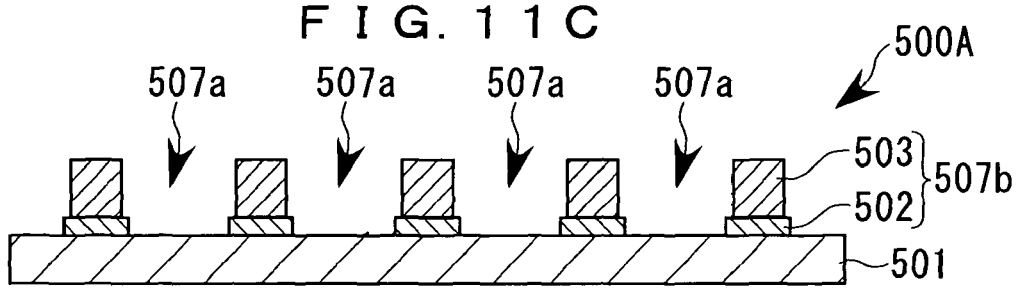

Furthermore, as shown in FIG. 11C, the resist layer 504 is patterned by performing etching processing on portions of the resist layer 504 which are not exposed, and the bank 503 is thus formed. Note that when the black matrix 502 is formed of a resin black, the black matrix 502 also serves as a bank.

The bank 503 and the black matrix 502 disposed beneath the bank 503 serve as a partition wall 507b for partitioning the pixel areas 507a. The partition wall 507b defines receiving areas for receiving the functional liquid ejected when the functional liquid droplet ejection heads 17 form coloring layers (film portions) 508R, 508G, and 508B in a subsequent coloring layer forming step.

The filter substrate 500A is obtained through the black matrix forming step and the bank forming step.

Note that, in this embodiment, a resin material having a lyophobic (hydrophobic) film surface is used as a material of the bank 503. Since a surface of the substrate (glass substrate) 501 is lyophilic (hydrophilic), variation of positions to which the liquid droplet is projected in the each of the pixel areas 507a surrounded by the bank 503 (partition wall 507b) can be automatically corrected in the subsequent coloring layer forming step.

Figure 11D:
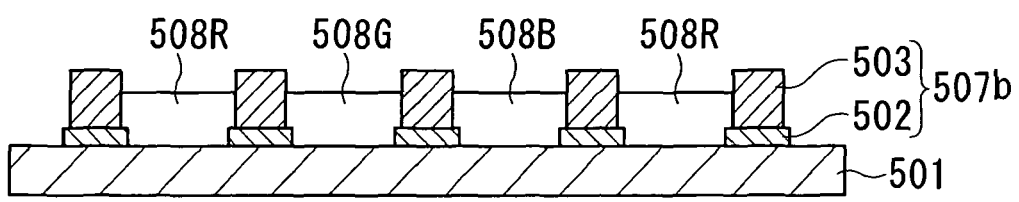

In the coloring layer forming step (S103), as shown in FIG. 11D, the functional liquid droplet ejection heads 17 eject the functional liquid within the pixel areas 507a each of which are surrounded by the partition wall 507b. In this case, the functional liquid droplet ejection heads 17 eject functional liquid droplets using functional liquid (filter materials) of colors R, G, and B. A color scheme pattern of the three colors R, G, and B may be the stripe arrangement, the mosaic arrangement, or the delta arrangement.

Figure 11E:
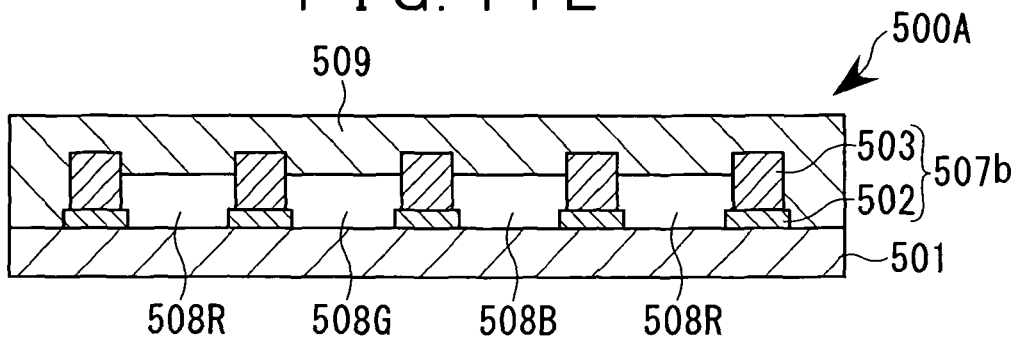

Then drying processing (such as heat treatment) is performed so that the three color functional liquid are fixed, and thus three coloring layers 508R, 508G, and 508B are formed. Thereafter, a protective film forming step is reached (step S104). As shown in FIG. 11E, a protective film 509 is formed so as to cover surfaces of the substrate 501, the partition wall 507b, and the three coloring layers 508R, 508G, and 508B.

That is, after liquid used for the protective film is ejected onto the entire surface of the substrate 501 on which the coloring layers 508R, 508G, and 508B are formed and the drying process is performed, the protective film 509 is formed.

In the manufacturing method of the color filter 500, after the protective film 509 is formed, a coating step is performed in which ITO (Indium Tin Oxide) serving as a transparent electrode in the subsequent step is coated.

Figure 12:
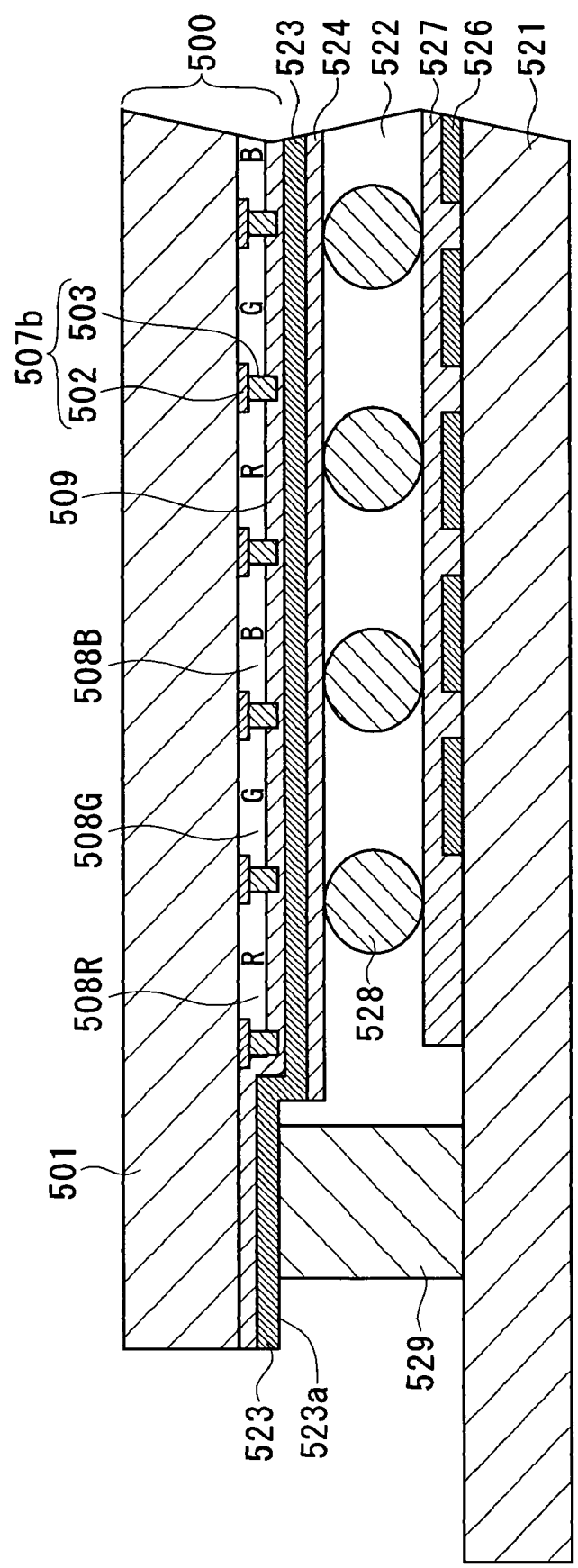
FIG. 12 is a sectional view schematically illustrating an essential part of a first liquid crystal display apparatus employing the color filter according to an embodiment of the invention.

FIG. 12 is a sectional view of an essential part of a passive matrix liquid crystal display apparatus (liquid crystal display apparatus 520) and schematically illustrates a configuration thereof as an example of a liquid crystal display apparatus employing the color filter 500. A transmissive liquid crystal display apparatus as a final product can be obtained by disposing a liquid crystal driving IC (integrated circuit), a backlight, and additional components such as supporting members on the display apparatus 520. Note that the color filter 500 is the same as that shown in FIGS. 11A to 11E, and therefore, reference numerals the same as those used in FIGS. 11A to 11E to denote the same components, and descriptions thereof are omitted.

The display apparatus 520 includes the color filter 500, a counter substrate 521 such as a glass substrate, and a liquid crystal layer 522 formed of STN (super twisted nematic) liquid crystal compositions sandwiched therebetween. The color filter 500 is disposed on the upper side of FIG. 13 (on an observer side).

Although not shown, polarizing plates are disposed so as to face an outer surface of the counter substrate 521 and an outer surface of the color filter 500 (surfaces which are remote from the liquid crystal layer 522). A backlight is disposed so as to face an outer surface of the polarizing plate disposed near the counter substrate 521.

A plurality of rectangular first electrodes 523 extending in a horizontal direction in FIG. 12 are formed with predetermined intervals therebetween on a surface of the protective film 509 (near the liquid crystal layer 522) of the color filter 500. A first alignment layer 524 is arranged so as to cover surfaces of the first electrodes 523 which are surfaces remote from the color filter 500.

On the other hand, a plurality of rectangular second electrodes 526 extending in a direction perpendicular to the first electrodes 523 disposed on the color filter 500 are formed with predetermined intervals therebetween on a surface of the counter substrate 521 which faces the color filter 500. A second alignment layer 527 is arranged so as to cover surfaces of the second electrodes 526 near the liquid crystal layer 522. The first electrodes 523 and the second electrodes 526 are formed of a transparent conductive material such as an ITO.

A plurality of spacers 528 disposed in the liquid crystal layer 522 are used to maintain the thickness (cell gap) of the liquid crystal layer 522 constant. A seal member 529 is used to prevent the liquid crystal compositions in the liquid crystal layer 522 from leaking to the outside. Note that an end of each of the first electrodes 523 extends beyond the seal member 529 and serves as wiring 523a.

Pixels are arranged at intersections of the first electrodes 523 and the second electrodes 526. The coloring layers 508R, 508G, and 508B are arranged on the color filter 500 so as to correspond to the pixels.

In normal manufacturing processing, the first electrodes 523 are patterned and the first alignment layer 524 is applied on the color filter 500 whereby a first half portion of the display apparatus 520 on the color filter 500 side is manufactured. Similarly, the second electrodes 526 are patterned and the second alignment layer 527 is applied on the counter substrate 521 whereby a second half portion of the display apparatus 520 on the counter substrate 521 side is manufactured. Thereafter, the spacers 528 and the seal member 529 are formed on the second half portion, and the first half portion is attached to the second half portion. Then, liquid crystal to be included in the liquid crystal layer 522 is injected from an inlet of the seal member 529, and the inlet is sealed. Finally, the polarizing plates and the backlight are disposed.

The liquid droplet ejection apparatus 1 of this embodiment may apply a spacer material (functional liquid) constituting the cell gap, for example, and uniformly apply liquid crystal (functional liquid) to an area sealed by the seal member 529 before the first half portion is attached to the second half portion. Furthermore, the seal member 529 may be printed using the functional liquid droplet ejection heads 17. Moreover, the first alignment layer 524 and the second alignment layer 527 may be applied using the functional liquid droplet ejection heads 17.

Figure 13:
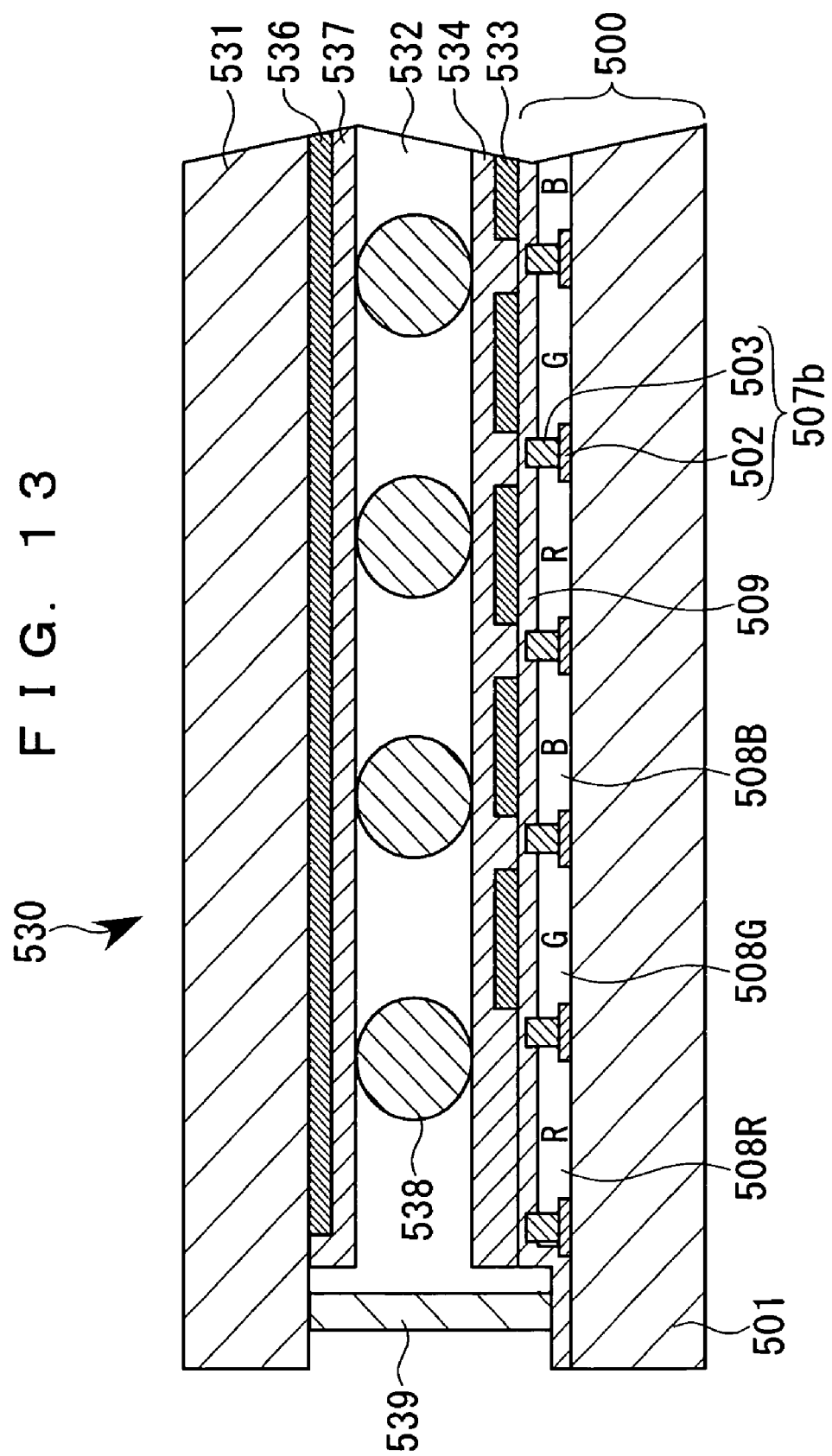
FIG. 13 is a sectional view schematically illustrating an essential part of a second liquid crystal display apparatus employing the color filter according to an embodiment of the invention.

FIG. 13 is a sectional view of an essential part of a display apparatus 530 and schematically illustrates a configuration thereof as a second example of a liquid crystal display apparatus employing the color filter 500 which is manufactured in this embodiment.

Figure 14:
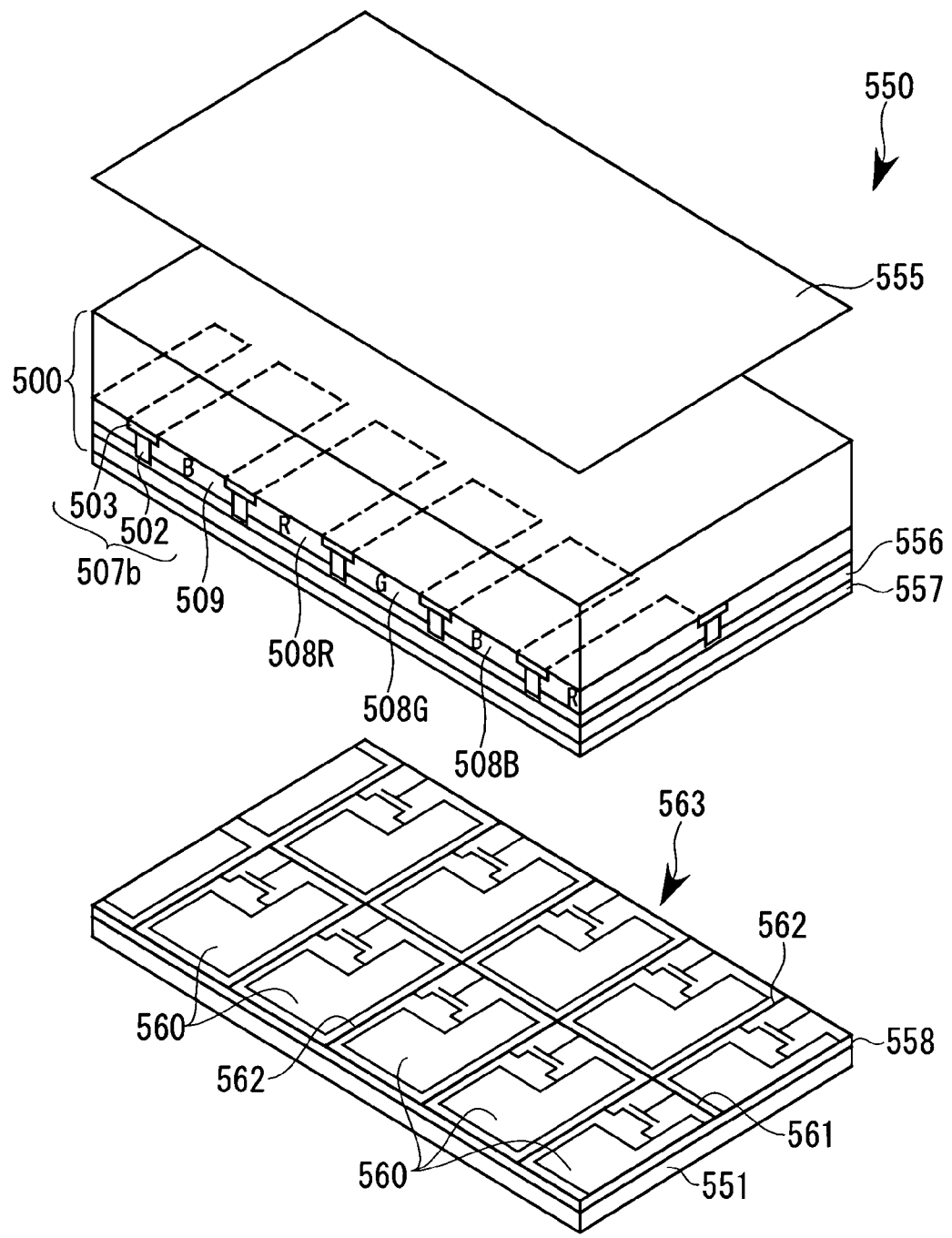
FIG. 14 is a perspective view schematically illustrating an essential part of a third liquid crystal display apparatus employing the color filter according to an embodiment of the invention.

The display apparatus 530 is considerably different from the display apparatus 520 in that the color filter 500 is disposed on a lower side in FIG. 14 (remote from the observer).

The display apparatus 530 is substantially configured such that a liquid crystal layer 532 constituted by STN liquid crystal is arranged between the color filter 500 and a counter substrate 531 such as a glass substrate. Although not shown, polarizing plates are disposed so as to face an outer surface of the counter substrate 531 and an outer surface of the color filter 500.

A plurality of rectangular first electrodes 533 extending in a depth direction of FIG. 14 are formed with predetermined intervals therebetween on a surface of the protective film 509 (near the liquid crystal layer 532) of the color filter 500. A first alignment layer 534 is arranged so as to cover surfaces of the first electrodes 533 which are surfaces near the liquid crystal layer 532.

On the other hand, a plurality of rectangular second electrodes 536 extending in a direction perpendicular to the first electrodes 533 disposed on the color filter 500 are formed with predetermined intervals therebetween on a surface of the counter substrate 531 which faces the color filter 500. A second alignment layer 537 is arranged so as to cover surfaces of the second electrodes 536 near the liquid crystal layer 532.

A plurality of spacers 538 disposed in the liquid crystal layer 532 are used to maintain the thickness (cell gap) of the liquid crystal layer 532 constant. A seal member 539 is used to prevent the liquid crystal compositions in the liquid crystal layer 532 from leaking to the outside.

As with the display apparatus 520, pixels are arranged at intersections of the first electrodes 533 and the second electrodes 536. The coloring layers 508R, 508G, and 508B are arranged on the color filter 500 so as to correspond to the pixels.

FIG. 14 is an exploded perspective view of a transmissive TFT (thin film transistor) liquid crystal display device and schematically illustrates a configuration thereof as a third example of a liquid crystal display apparatus employing the color filter 500 to which the invention is applied.

A liquid crystal display apparatus 550 has the color filter 500 disposed on the upper side of FIG. 14 (on the observer side).

The liquid crystal display apparatus 550 includes the color filter 500, a counter substrate 551 disposed so as to face the color filter 500, a liquid crystal layer (not shown) interposed therebetween, a polarizing plate 555 disposed so as to face an upper surface of the color filter 500 (on the observer side), and a polarizing plate (not shown) disposed so as to face a lower surface of the counter substrate 551.

An electrode 556 used for driving the liquid crystal is formed on a surface of the protective film 509 (a surface near the counter substrate 551) of the color filter 500. The electrode 556 is formed of a transparent conductive material such as an ITO and entirely covers an area in which pixel electrodes 560 are to be formed which will be described later. An alignment layer 557 is arranged so as to cover a surface of the electrode 556 remote from the pixel electrode 560.

An insulating film 558 is formed on a surface of the counter substrate 551 which faces the color filter 500. On the insulating film 558, scanning lines 561 and signal lines 562 are arranged so as to intersect with each other. Pixel electrodes 560 are formed in areas surrounded by the scanning lines 561 and the signal lines 562. Note that an alignment layer (not shown) is arranged on the pixel electrodes 560 in an actual liquid crystal display apparatus.

Thin-film transistors 563 each of which includes a source electrode, a drain electrode, a semiconductor layer, and a gate electrode are incorporated in areas surrounded by notch portions of the pixel electrodes 560, the scanning lines 561, and the signal lines 562. When signals are supplied to the scanning lines 561 and the signal lines 562, the thin-film transistors 563 are turned on or off so that power supply to the pixel electrodes 560 is controlled.

Note that although each of the display apparatuses 520, 530, and 550 is configured as a transmissive liquid crystal display apparatus, each of the display apparatuses 520, 530, and 550 may be configured as a reflective liquid crystal display apparatus having a reflective layer or a semi-transmissive liquid crystal display apparatus having a semi-transmissive reflective layer.

Figure 15:
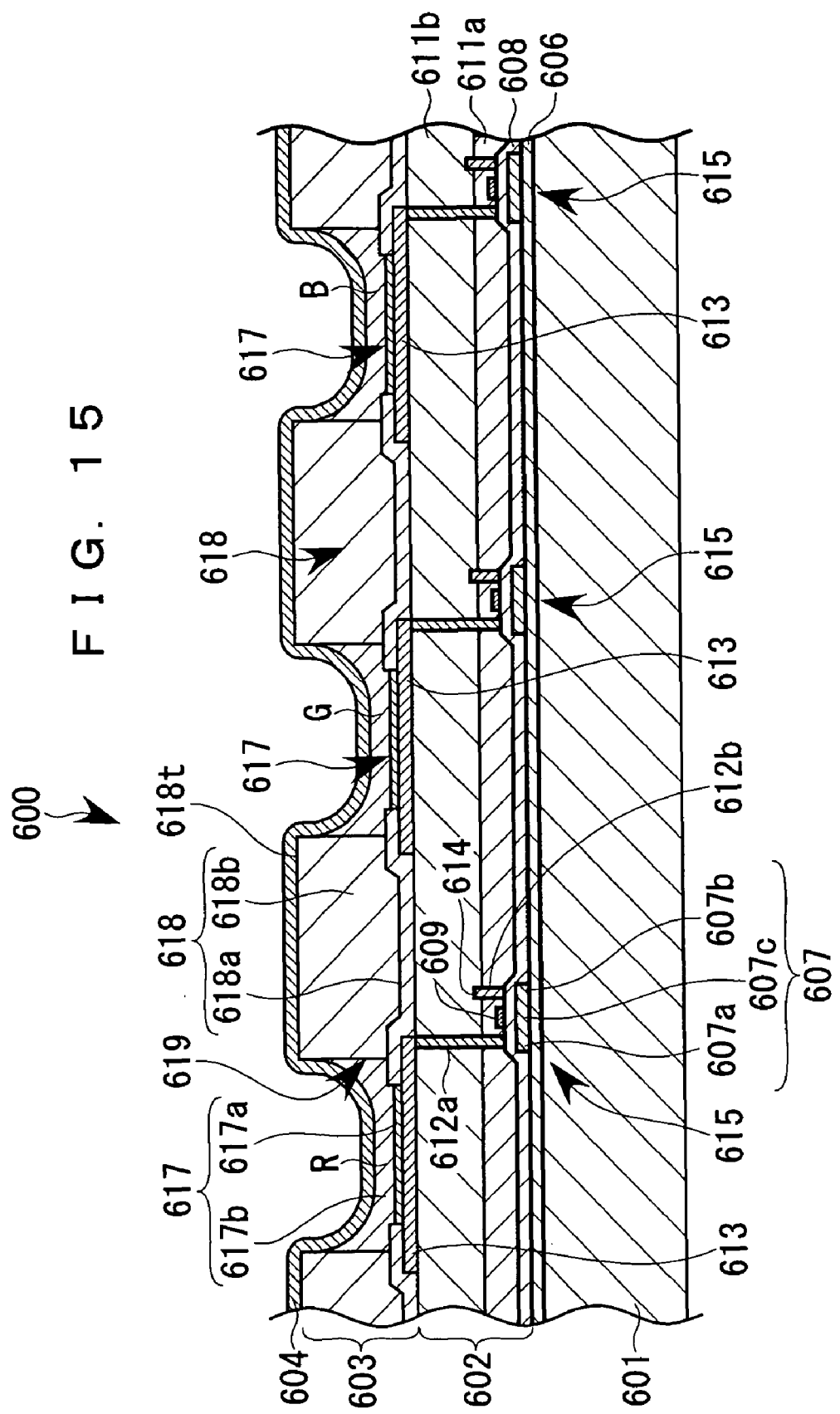
FIG. 15 is a sectional view illustrating an essential part of an organic EL display apparatus.

FIG. 15 is a sectional view illustrating an essential part of a display area of an organic EL apparatus (hereinafter simply referred to as a display apparatus 600).

In this display apparatus 600, a circuit element portion 602, a light-emitting element portion 603, and a cathode 604 are laminated on a substrate (W) 601.

In this display apparatus 600, light is emitted from the light-emitting element portion 603 through the circuit element portion 602 toward the substrate 601 and eventually is emitted to an observer side. In addition, light emitted from the light-emitting element portion 603 toward an opposite side of the substrate 601 is reflected by the cathode 604, and thereafter passes through the circuit element portion 602 and the substrate 601 to be emitted to the observer side.

An underlayer protective film 606 formed of a silicon oxide film is arranged between the circuit element portion 602 and the substrate 601. Semiconductor films 607 formed of polysilicon oxide films are formed on the underlayer protective film 606 (near the light-emitting element portion 603) in an isolated manner. In each of the semiconductor films 607, a source region 607a and a drain region 607b are formed on the left and right sides thereof, respectively, by high-concentration positive-ion implantation. The center portion of each of the semiconductor films 607 which is not subjected to high-concentration positive-ion implantation serves as a channel region 607c.

In the circuit element portion 602, the underlayer protective film 606 and a transparent gate insulating film 608 covering the semiconductor films 607 are formed. Gate electrodes 609 formed of, for example, Al, Mo, Ta, Ti, or W are disposed on the gate insulating film 608 so as to correspond to the channel regions 607c of the semiconductor films 607. A first transparent interlayer insulating film 611a and a second transparent interlayer insulating film 611b are formed on the gate electrodes 609 and the gate insulating film 608. Contact holes 612a and 612b are formed so as to penetrate the first interlayer insulating film 611a and the second interlayer insulating film 611b and to be connected to the source region 607a and the drain region 607b of the semiconductor films 607.

Pixel electrodes 613 which are formed of ITOs, for example, and which are patterned to have a predetermined shape are formed on the second interlayer insulating film 611b. The pixel electrode 613 is connected to the source region 607a through the contact holes 612a.

Power source lines 614 are arranged on the first interlayer insulating film 611a. The power source lines 614 are connected through the contact holes 612b to the drain region 607b.

As shown in FIG. 15, the circuit element portion 602 includes thin-film transistors 615 connected to drive the respective pixel electrodes 613.

The light-emitting element portion 603 includes a functional layers 617 each formed on a corresponding one of pixel electrodes 613, and bank portions 618 which are formed between the pixel electrodes 613 and the functional layers 617 and which are used to partition the functional layers 617 from one another.

The pixel electrodes 613, the functional layers 617, and the cathode 604 formed on the functional layers 617 constitute the light-emitting element. Note that the pixel electrodes 613 are formed into a substantially rectangular shape in plan view by patterning, and the bank portions 618 are formed so that each two of the pixel electrodes 613 sandwich a corresponding one of the bank portions 618.

Each of the bank portions 618 includes an inorganic bank layer 618a (first bank layer) formed of an inorganic material such as SiO, $SiO_2$, or $TiO_2$, and an organic bank layer 618b (second bank layer) which is formed on the inorganic bank layer 618a and has a trapezoidal shape in a sectional view. The organic bank layer 618b is formed of a resist, such as an acrylic resin or a polyimide resin, which has an excellent heat resistance and an excellent lyophobic characteristic. A part of each of the bank portions 618 overlaps peripheries of corresponding two of the pixel electrodes 613 which sandwich each of the bank portions 618.

Openings 619 are formed between the bank portions 618 so as to gradually increase in size upwardly against the pixel electrodes 613.

Each of the functional layers 617 includes a positive-hole injection/transport layer 617a formed so as to be laminated on the pixel electrodes 613 and a light-emitting layer 617b formed on the positive-hole injection/transport layer 617a. Note that another functional layer having another function may be arranged so as to be arranged adjacent to the light-emitting layer 617b. For example, an electronic transport layer may be formed.

The positive-hole injection/transport layer 617a transports positive holes from a corresponding one of the pixel electrodes 613 and injects the transported positive holes to the light-emitting layer 617b. The positive-hole injection/transport layer 617a is formed by ejection of a first composition (functional liquid) including a positive-hole injection/transport layer forming material. The positive-hole injection/transport layer forming material may be a known material.

The light-emitting layer 617b is used for emission of light having colors red (R), green (G), or blue (B), and is formed by ejection of a second composition (functional liquid) including a material for forming the light-emitting layer 617b (light-emitting material). As a solvent of the second composition (nonpolar solvent), a known material which is insoluble to the positive-hole injection/transport layer 617a is preferably used. Since such a nonpolar solvent is used as the second composition of the light-emitting layer 617b, the light-emitting layer 617b can be formed without dissolving the positive-hole injection/transport layer 617a again.

The light-emitting layer 617b is configured such that the positive holes injected from the positive-hole injection/transport layer 617a and electrons injected from the cathode 604 are recombined in the light-emitting layer 617b so as to emit light.

The cathode 604 is formed so as to cover an entire surface of the light-emitting element portion 603, and in combination with the pixel electrodes 613, supplies current to the functional layers 617. Note that a sealing member (not shown) is arranged on the cathode 604.

Steps of manufacturing the display apparatus 600 will now be described with reference to FIGS. 16 to 24.

Figure 16:
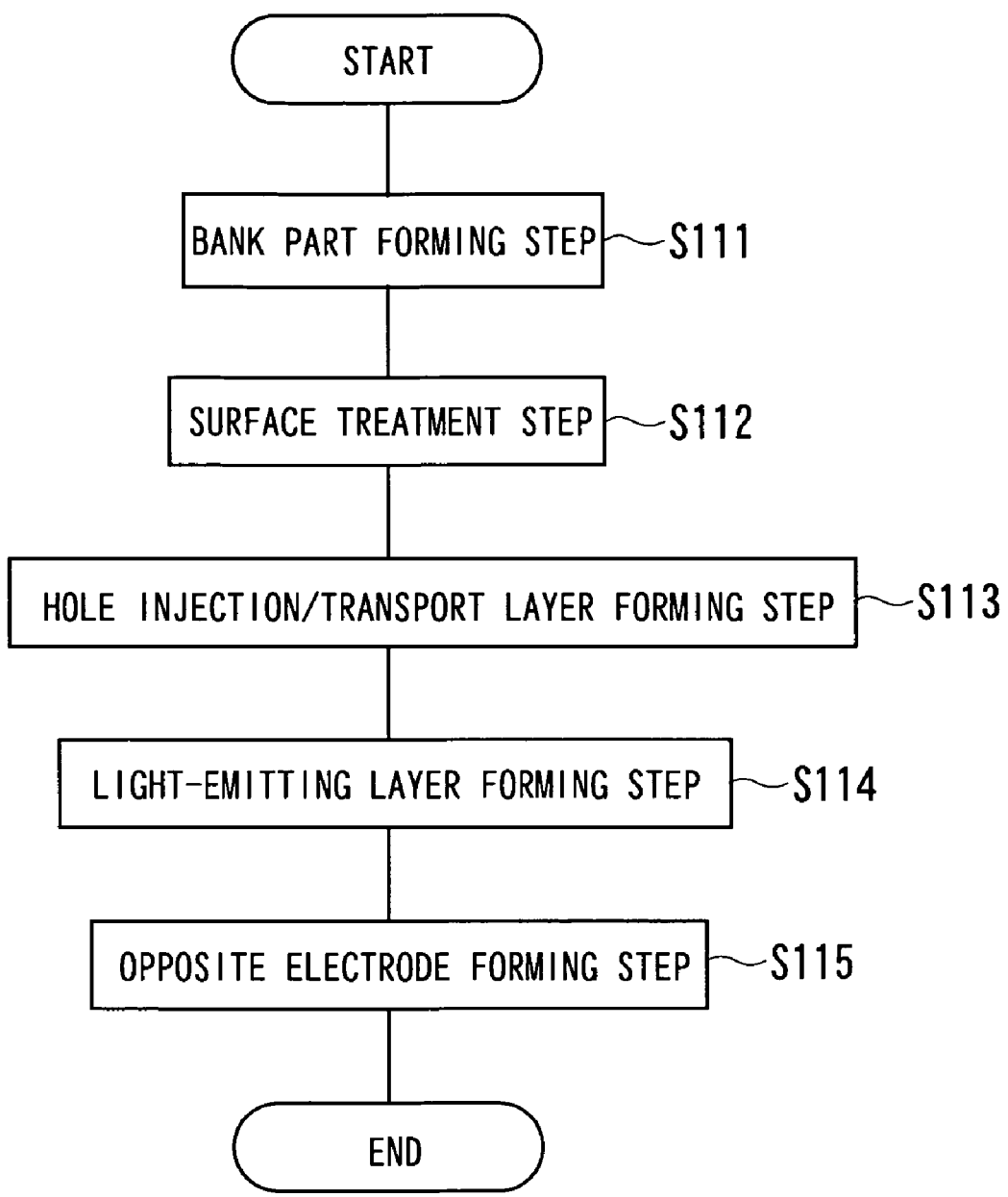
FIG. 16 is a flowchart illustrating manufacturing steps of the organic EL display apparatus.

As shown in FIG. 16, the display apparatus 600 is manufactured through a bank portion forming step (S111), a surface processing step (S112), a positive-hole injection/transport layer forming step (S113), a light-emitting layer forming step (S114), and a counter electrode forming step (S115). Note that the manufacturing steps are not limited to these examples shown in FIG. 16, and one of these steps may be omitted or another step may be added according as desired.

Figure 17:
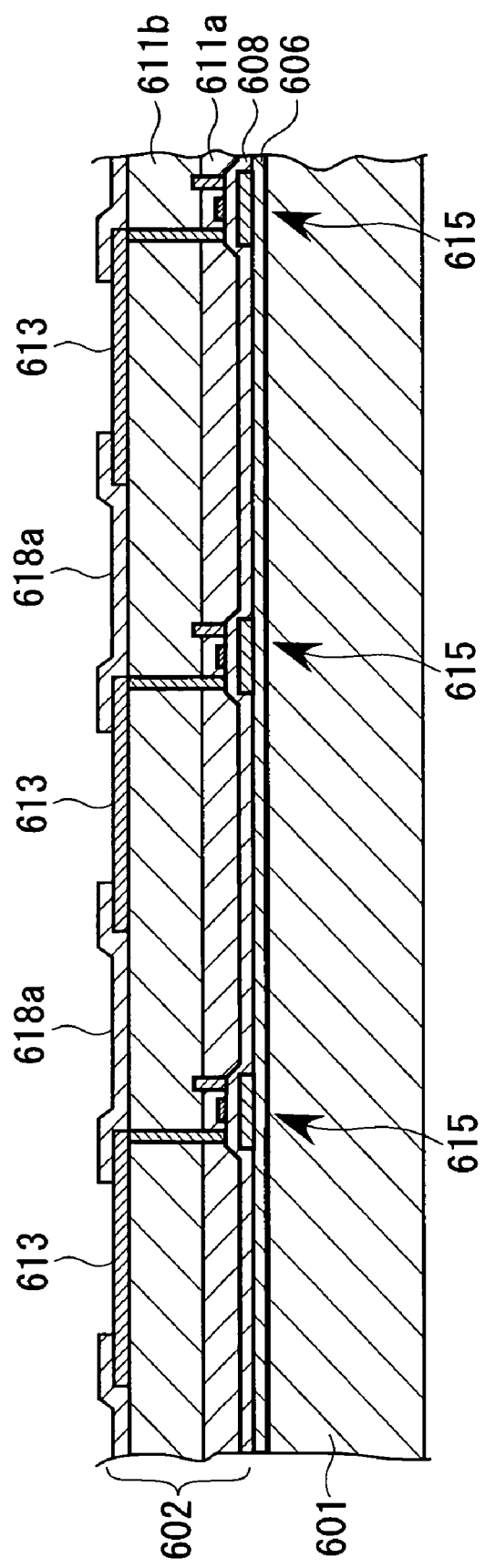
FIG. 17 is a process chart illustrating formation of an inorganic bank layer.

In the bank portion forming step (S111), as shown in FIG. 17, the inorganic bank layers 618a are formed on the second interlayer insulating film 611b. The inorganic bank layers 618a are formed by forming an inorganic film at a desired position and by patterning the inorganic film by the photolithography technique. At this time, a part of each of the inorganic bank layers 618a overlaps peripheries of corresponding two of the pixel electrodes 613 which sandwich each of the inorganic bank layers 618a.

Figure 18:
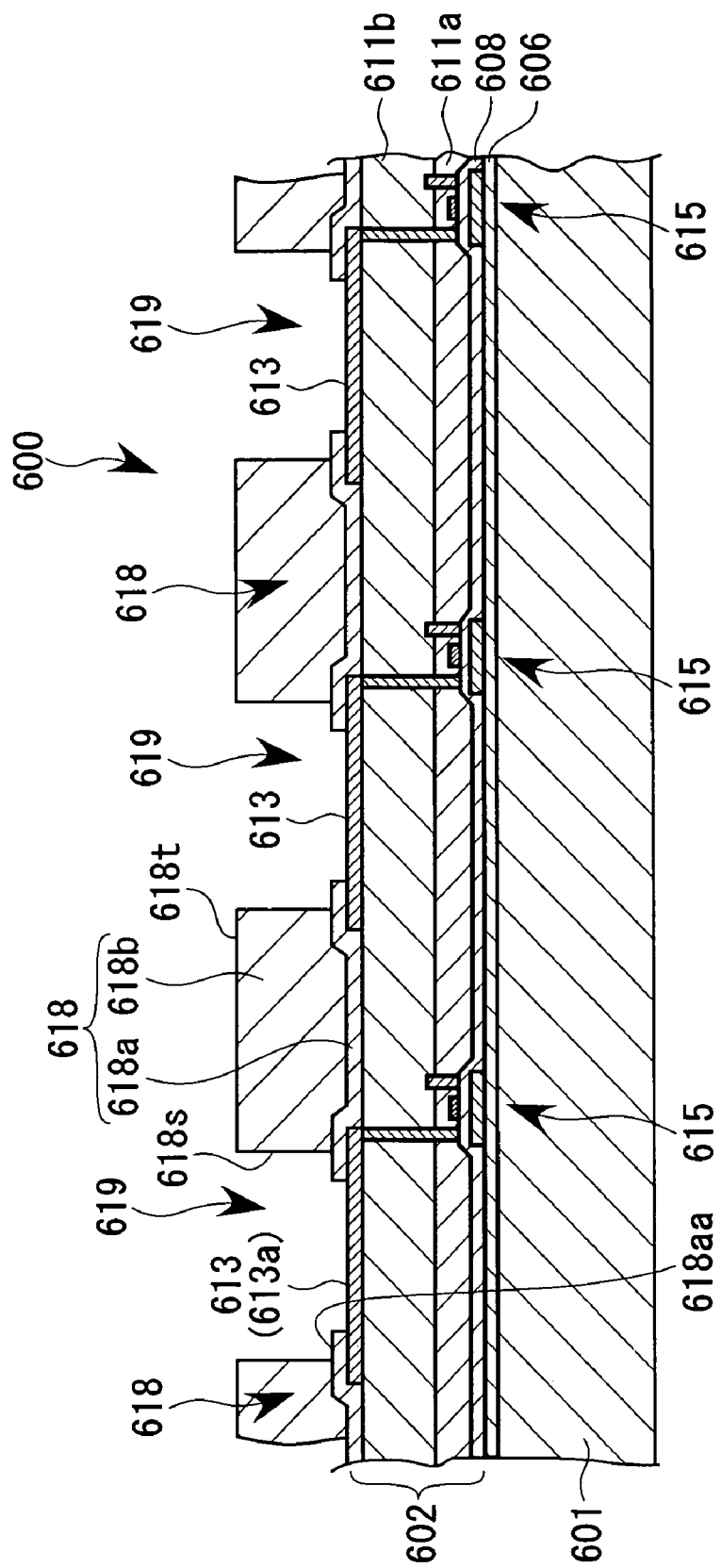
FIG. 18 is a process chart illustrating formation of an organic bank layer.

After the inorganic bank layers 618a are formed, as shown in FIG. 18, the organic bank layers 618b are formed on the inorganic bank layers 618a. As with the inorganic bank layers 618a, the organic bank layers 618b are formed by patterning a formed organic film by the photolithography technique.

The bank portions 618 are thus formed. When the bank portions 618 are formed, the openings 619 opening upward relative to the pixel electrodes 613 are formed between the bank portions 618. The openings 619 define pixel areas.

In the surface processing step (S112), a hydrophilic treatment and a repellency treatment are performed. The hydrophilic treatment is performed on first lamination areas 618aa of the inorganic bank layers 618a and electrode surfaces 613a of the pixel electrodes 613. The hydrophilic treatment is performed, for example, by plasma processing using oxide as a processing gas on surfaces of the first lamination areas 618*aa* and the electrode surfaces 613*a* to have hydrophilic properties. By performing the plasma processing, the ITO forming the pixel electrodes 613 is cleaned.

The repellency treatment is performed on walls 618*s* of the organic bank layers 618*b* and upper surfaces 618*t* of the organic bank layers 618*b*. The repellency treatment is performed as a fluorination treatment, for example, by plasma processing using tetrafluoromethane as a processing gas on the walls 618*s* and the upper surfaces 618*t*.

By performing this surface processing step, when the functional layers 617 is formed using the functional liquid droplet ejection heads 17, the functional liquid droplets are ejected onto the pixel areas with high accuracy. Furthermore, the functional liquid droplets attached onto the pixel areas are prevented from flowing out of the openings 619.

A display apparatus body 600A is obtained through these steps. The display apparatus body 600A is mounted on the set table 21 of the liquid droplet ejection apparatus 1 shown in FIG. 1 and the positive-hole injection/transport layer forming step (S113) and the light-emitting layer forming step (S114) are performed thereon.

Figure 19:
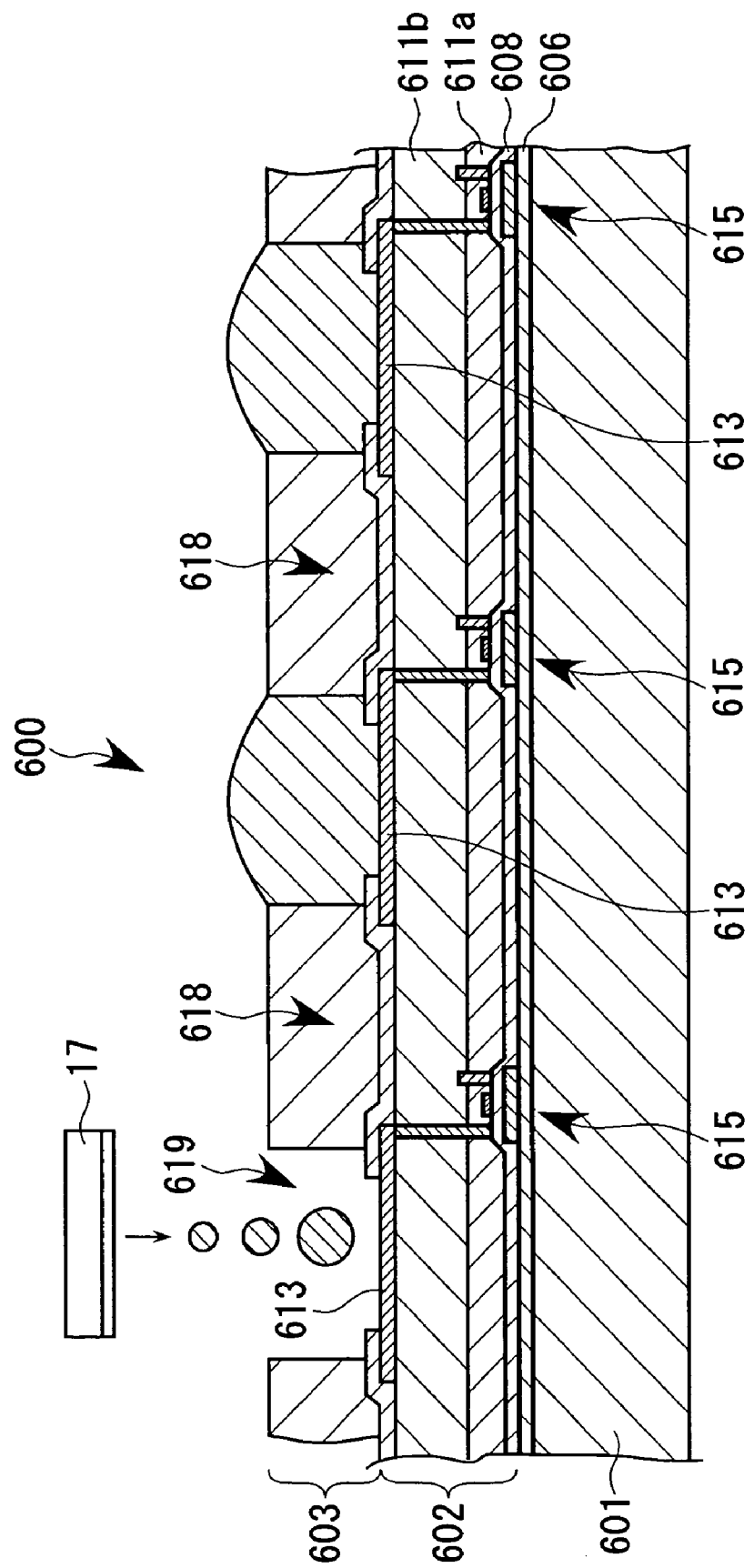
FIG. 19 is a process chart illustrating processes of forming a positive-hole injection/transport layer.
Figure 20:
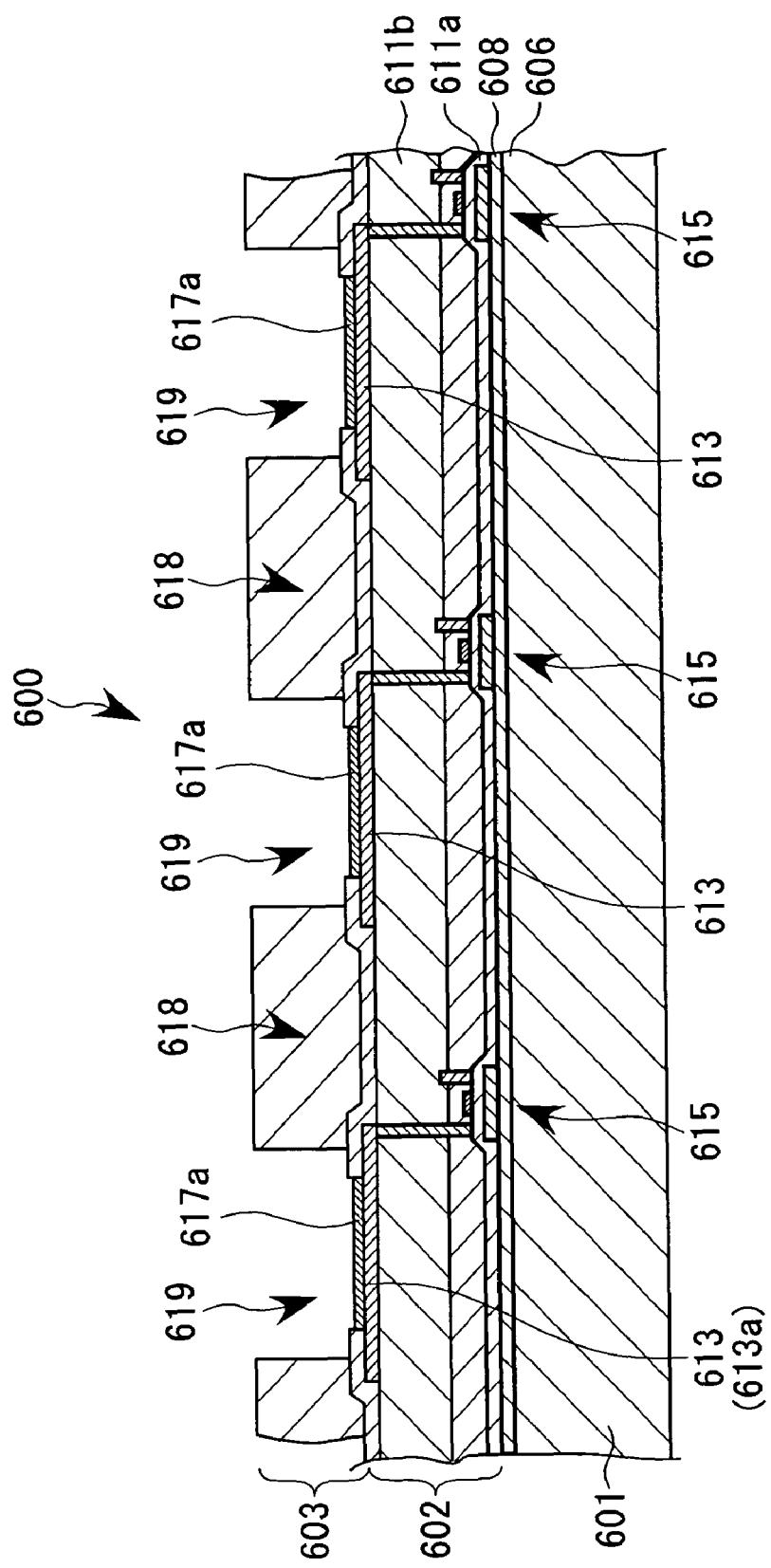
FIG. 20 is a process chart illustrating a state where the positive-hole injection/transport layer has been formed.

As shown in FIG. 19, in the positive-hole injection/transport layer forming step (S113), the first compositions including the material for forming a positive-hole injection/transport layer are ejected from the functional liquid droplet ejection heads 17 into the openings 619 included in the pixel areas. Thereafter, as shown in FIG. 20, drying processing and a thermal treatment are performed to evaporate polar solution included in the first composition whereby the positive-hole injection/transport layers 617*a* are formed on the pixel electrodes 613 (electrode surface 613*a*).

The light-emitting layer forming step (S114) will now be described. In the light-emitting layer forming step, as described above, a nonpolar solvent which is insoluble to the positive-hole injection/transport layers 617*a* is used as the solvent of the second composition used at the time of forming the light-emitting layer in order to prevent the positive-hole injection/transport layers 617*a* from being dissolved again.

On the other hand, since each of the positive-hole injection/transport layers 617*a* has low affinity to a nonpolar solvent, even when the second composition including the nonpolar solvent is ejected onto the positive-hole injection/transport layers 617*a*, the positive-hole injection/transport layers 617*a* may not be brought into tight contact with the light-emitting layers 617*b* or the light-emitting layers 617*b* may not be uniformly applied.

Accordingly, before the light-emitting layers 617*b* are formed, surface processing (surface improvement processing) is preferably performed so that each of the positive-hole injection/transport layers 617*a* has high affinity to the nonpolar solvent and to the material for forming the light-emitting layers. The surface processing is performed by applying a solvent the same as or similar to the nonpolar solvent of the second composition used at the time of forming the light-emitting layers on the positive-hole injection/transport layers 617*a* and by drying the applied solvent.

Employment of this surface processing allows the surface of the positive-hole injection/transport layers 617*a* to have high affinity to the nonpolar solvent, and therefore, the second composition including the material for forming the light-emitting layers can be uniformly applied to the positive-hole injection/transport layers 617*a* in the subsequent step.

Figure 21:
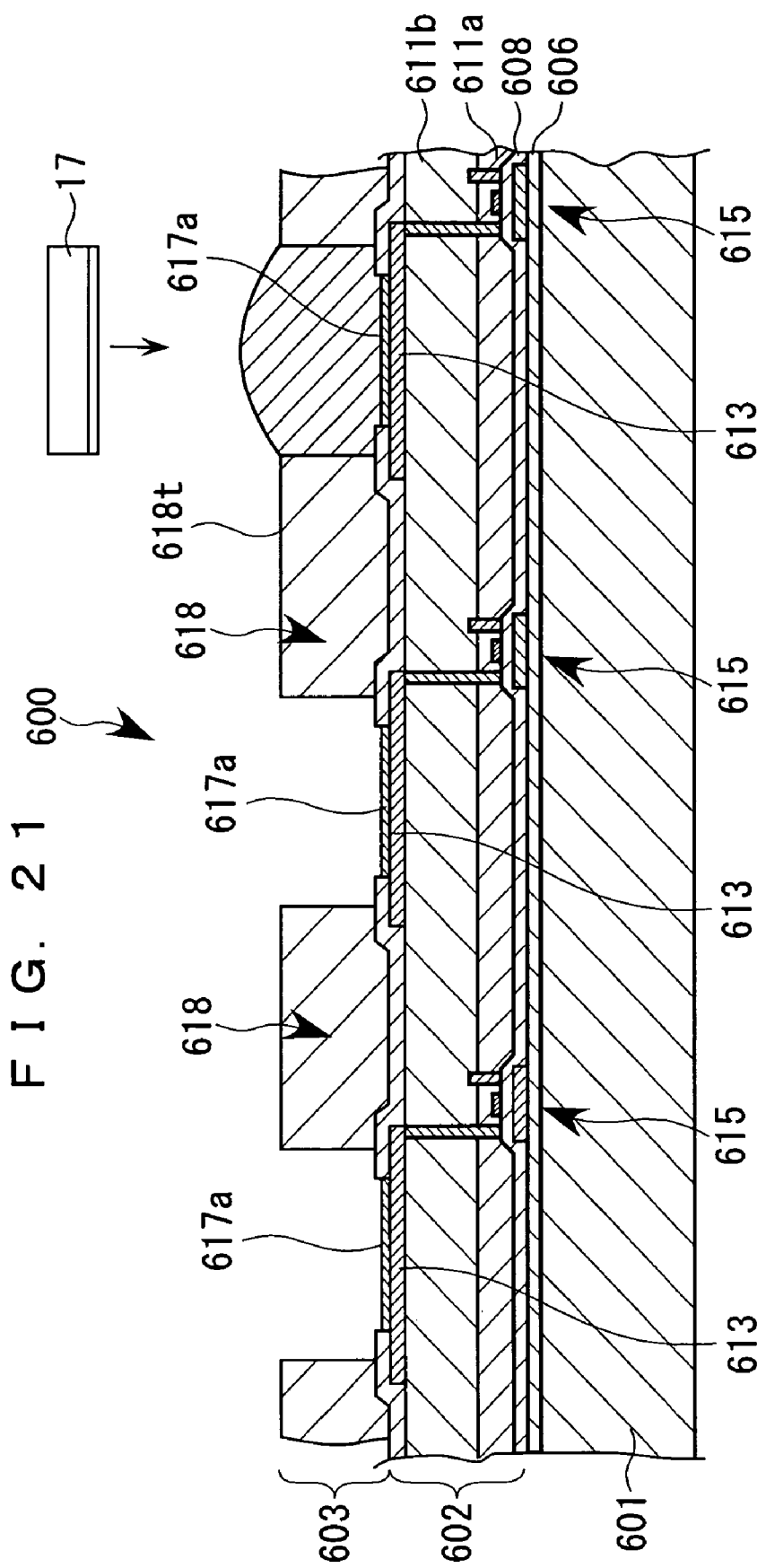
FIG. 21 is a process chart illustrating processes for forming a light-emitting layer having a blue color component.

As shown in FIG. 21, a predetermined amount of second composition including the material for forming the light-emission layers of one of the three colors (blue color (B) in an example of FIG. 21) is ejected into the pixel areas (openings 619) as functional liquid. The second composition ejected into the pixel areas spreads over the positive-hole injection/transport layer 617*a* and fills the openings 619. Note that, even if the second composition is ejected and attached to the upper surfaces 618*t* of the bank portions 618 which are outside of the pixel area, since the repellency treatment has been performed on the upper surfaces 618*t* as described above, the second component easily drops into the openings 619.

Figure 22:
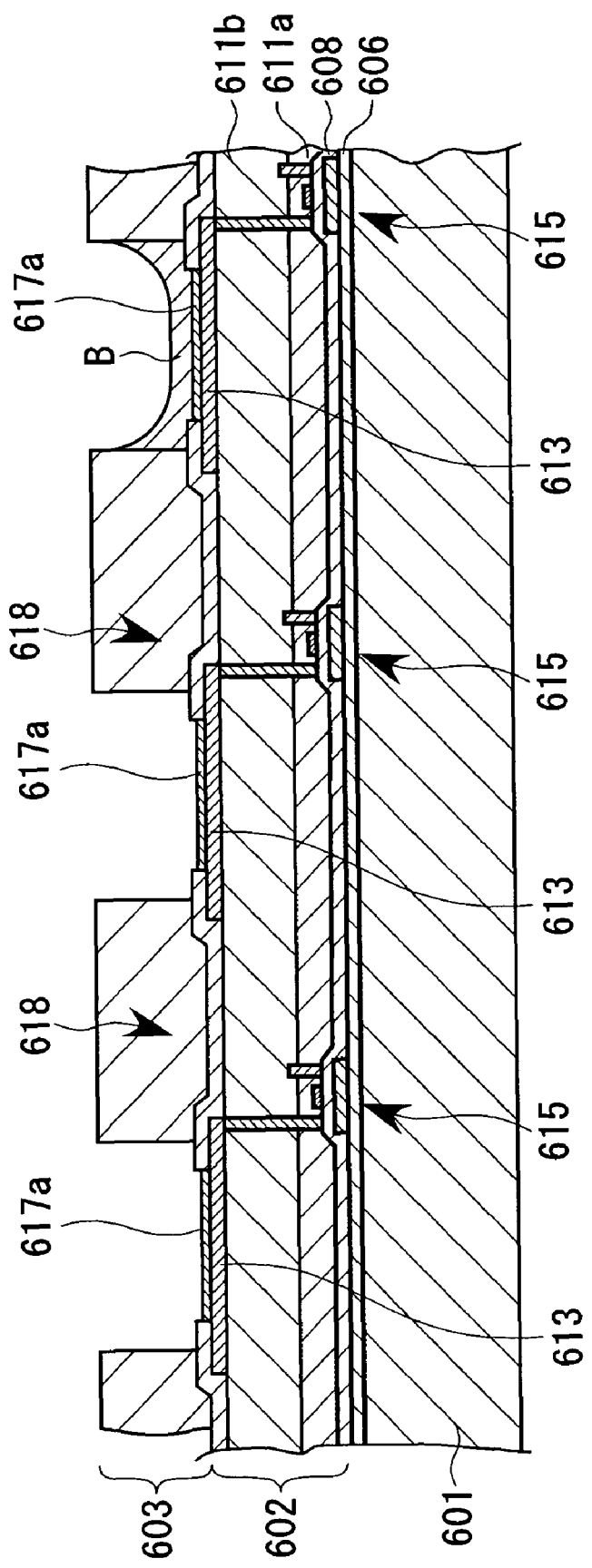
FIG. 22 is a process chart illustrating a state where the light-emitting layer having a blue color component has been formed.

Thereafter, the drying processing is performed so that the ejected second composition is dried and the nonpolar solvent included in the second composition is evaporated whereby the light-emitting layers 617*b* are formed on the positive-hole injection/transport layers 617*a* as shown in FIG. 22. In FIG. 22, one of the light-emitting layers 617*b* corresponding to the blue color (B) is formed.

Figure 23:
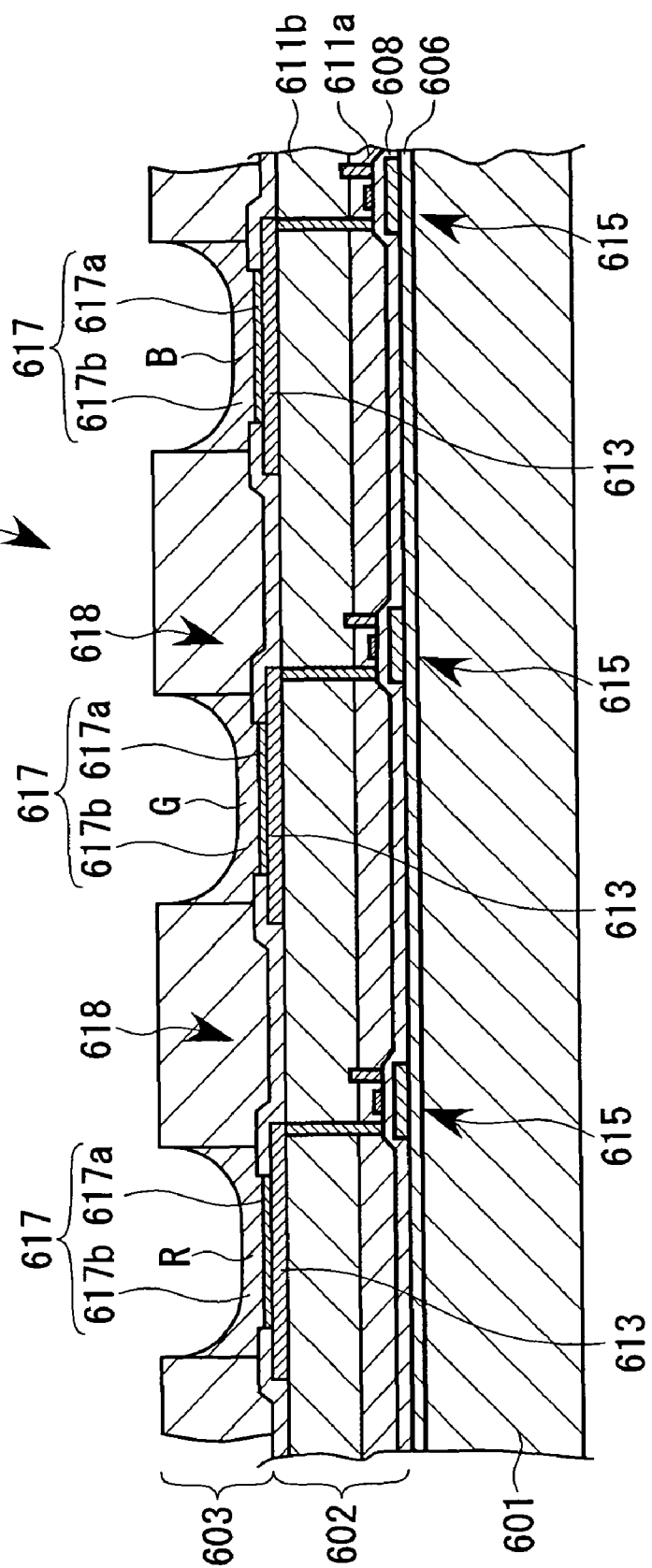
FIG. 23 is a process chart illustrating a state where light-emitting layers having three color components have been formed.

Similarly, as shown in FIG. 23, a step similar to the above-described step of forming the light-emitting layers 617*b* corresponding to the blue color (B) is repeatedly performed by using functional liquid droplet ejection heads 17 so that the light-emitting layers 617*b* corresponding to other colors (red (R) and green (G)) are formed. Note that the order of formation of the light-emitting layers 617*b* is not limited to the order described above as an example, and any other orders may be applicable. For example, an order of forming the light-emitting layers 617*b* may be determined in accordance with a light-emitting layer forming material. Furthermore, the color scheme pattern of the three colors R, G, and B may be the stripe arrangement, the mosaic arrangement, or the delta arrangement.

As described above, the functional layers 617, that is, the positive-hole injection/transport layers 617*a* and the light-emitting layers 617*b* are formed on the pixel electrodes 613. Then, the process proceeds to the counter electrode forming step (S115).

Figure 24:
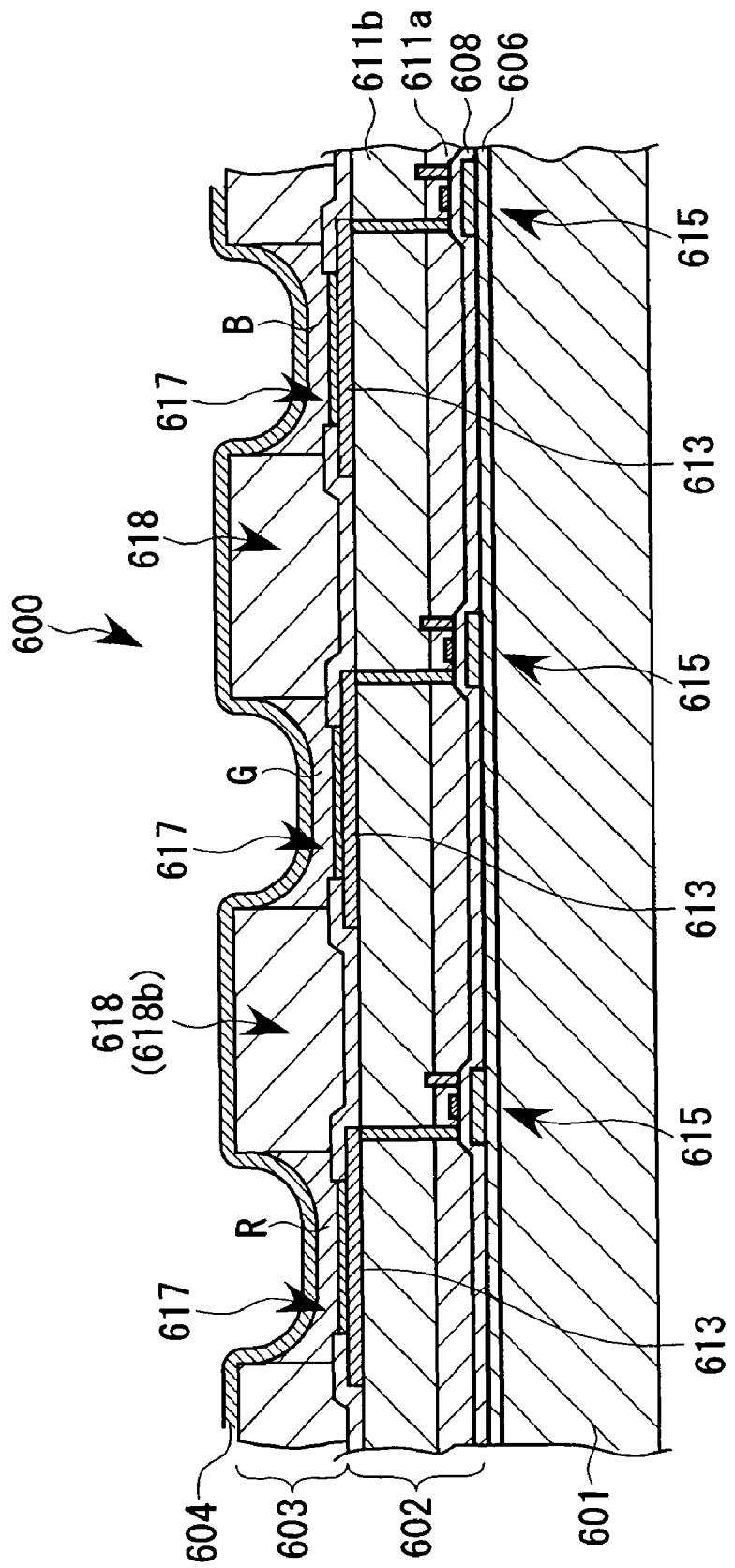
FIG. 24 is a process chart illustrating processes for forming a cathode.

In the counter electrode forming step (S115), as shown in FIG. 24, the cathode (counter electrode) 604 is formed on entire surfaces of the light-emitting layers 617*b* and the organic bank layers 618*b* by an evaporation method, sputtering, or a CVD (chemical vapor deposition) method, for example. The cathode 604 is formed by laminating a calcium layer and an aluminum layer, for example, in this embodiment.

An Al film and a Ag film as electrodes and a protective layer formed of $SiO_2$ or SiN for preventing the Al film and the Ag film from being oxidized are formed on the cathode 604.

After the cathode 604 is thus formed, other processes such as sealing processing of sealing a top surface of the cathode 604 with a sealing member and wiring processing are performed whereby the display apparatus 600 is obtained.

Figure 25:
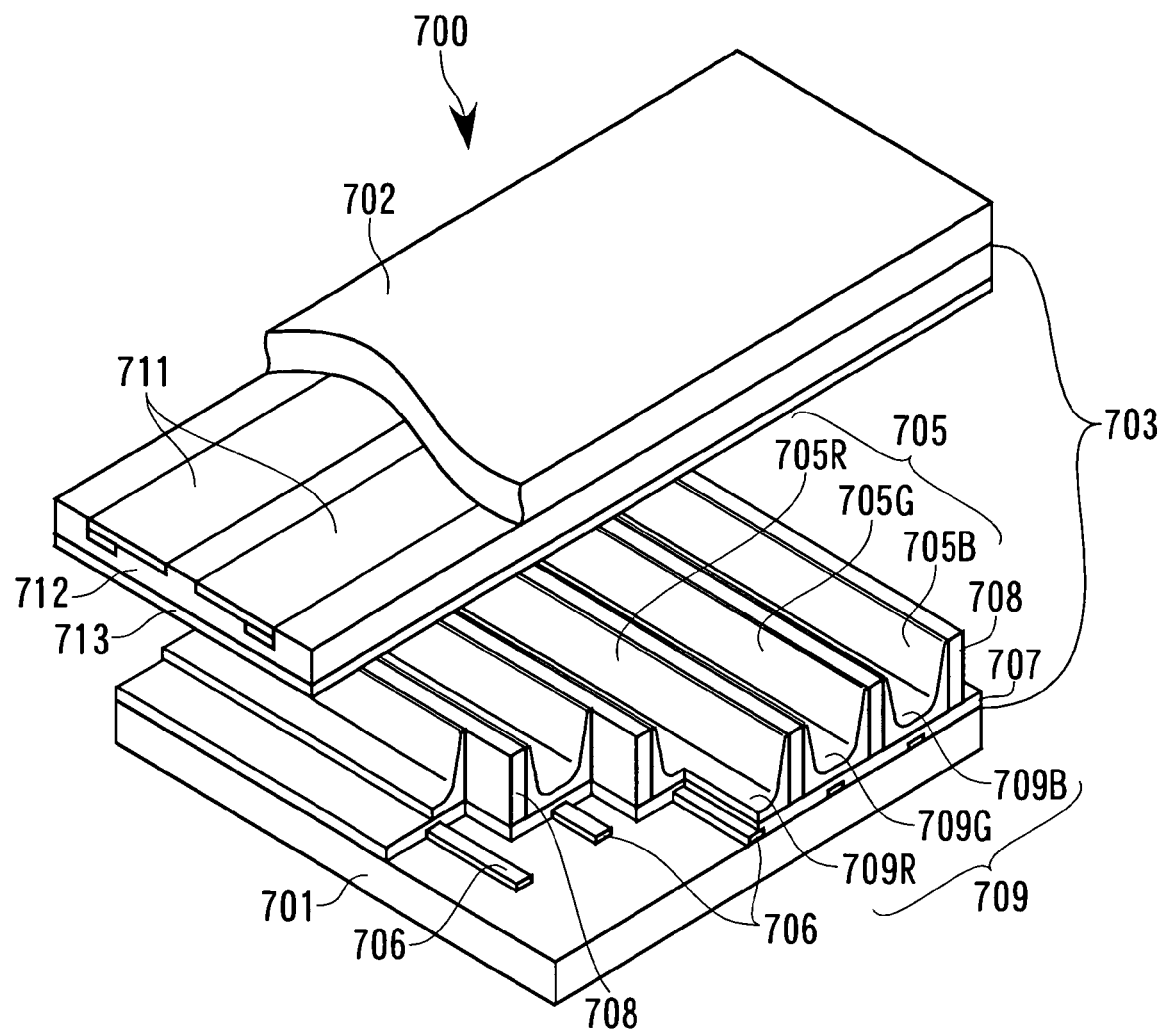
FIG. 25 is a perspective view illustrating an essential part of a plasma display apparatus (PDP apparatus).

FIG. 25 is an exploded perspective view of an essential part of a plasma display apparatus (PDP apparatus: hereinafter simply referred to as a display apparatus 700). Note that, in FIG. 25, the display apparatus 700 is partly cut away.

The display apparatus 700 includes a first substrate 701, a second substrate 702 which faces the first substrate 701, and a discharge display portion 703 interposed therebetween. The discharge display portion 703 includes a plurality of discharge chambers 705. The discharge chambers 705 include red discharge chambers 705R, green discharge chambers 705G, and blue discharge chambers 705B, and are arranged so that one of the red discharge chambers 705R, one of the green discharge chambers 705G, and one of the blue discharge chambers 705B constitute one pixel as a group.

Address electrodes 706 are arranged on the first substrate 701 with predetermined intervals therebetween in a stripe pattern, and a dielectric layer 707 is formed so as to cover top surfaces of the address electrodes 706 and the first substrate 701. Partition walls 708 are arranged on the dielectric layer 707 so as to be arranged along with the address electrodes 706 in a standing manner between the adjacent address electrodes 706. Some of the partition walls 708 extend in a width direction of the address electrodes 706 as shown in FIG. 25, and the others (not shown) extend perpendicular to the address electrodes 706.

Regions partitioned by the partition walls 708 serve as the discharge chambers 705.

The discharge chambers 705 include respective fluorescent substances 709. Each of the fluorescent substances 709 emits light having one of the colors of red (R), green (G) and blue (B). The red discharge chamber 705R has a red fluorescent substance 709R on its bottom surface, the green discharge chamber 705G has a green fluorescent substance 709G on its bottom surface, and the blue discharge chamber 705B has a blue fluorescent substance 709B on its bottom surface.

On a lower surface of the second substrate 72 in FIG. 25, a plurality of display electrodes 711 are formed with predetermined intervals therebetween in a stripe manner in a direction perpendicular to the address electrodes 706. A dielectric layer 712 and a protective film 713 formed of MgO, for example, are formed so as to cover the display electrodes 711.

The first substrate 701 and the second substrate 702 are attached so that the address electrodes 706 are arranged perpendicular to the display electrodes 711. Note that the address electrodes 706 and the display electrodes 711 are connected to an alternate power source (not shown).

When the address electrodes 706 and the display electrodes 711 are brought into conduction states, the fluorescent substances 709 are excited and emit light whereby display with colors is achieved.

In this embodiment, the address electrodes 706, the display electrodes 711, and the fluorescent substances 709 may be formed using the liquid droplet ejection apparatus 1 shown in FIG. 1. Steps of forming the address electrodes 706 on the first substrate 701 are described hereinafter.

The steps are performed in a state where the first substrate 701 is mounted on the set table 21 on the liquid droplet ejection apparatus 1.

The functional liquid droplet ejection heads 17 eject a liquid material (functional liquid) including a material for forming a conducting film wiring as functional droplets to be attached onto regions for forming the address electrodes 706. The material for forming a conducting film wiring included in the liquid material is formed by dispersing conductive fine particles such as those of a metal into dispersed media. Examples of the conductive fine particles include a metal fine particle including gold, silver, copper, palladium, or nickel, and a conductive polymer.

When ejection of the liquid material onto all the desired regions for forming the address electrodes 706 is completed, the ejected liquid material is dried, and the disperse media included in the liquid material is evaporated whereby the address electrodes 706 are formed.

Although the steps of forming the address electrodes 706 are described as an example above, the display electrodes 711 and the fluorescent substances 709 may be formed by the steps described above.

In a case where the display electrodes 711 are formed, as with the address electrodes 706, a liquid material (functional liquid) including a material for forming a conducting film wiring is ejected from the functional liquid droplet ejection heads 17 as liquid droplets to be attached to the areas for forming the display electrodes.

In a case where the fluorescent substances 709 are formed, a liquid material including fluorescent materials corresponding to three colors (R, G, and B) is ejected as liquid droplets from the functional liquid droplet ejection heads 17 so that liquid droplets having the three colors (R, G, and B) are attached within the discharge chambers 705.

Figure 26:
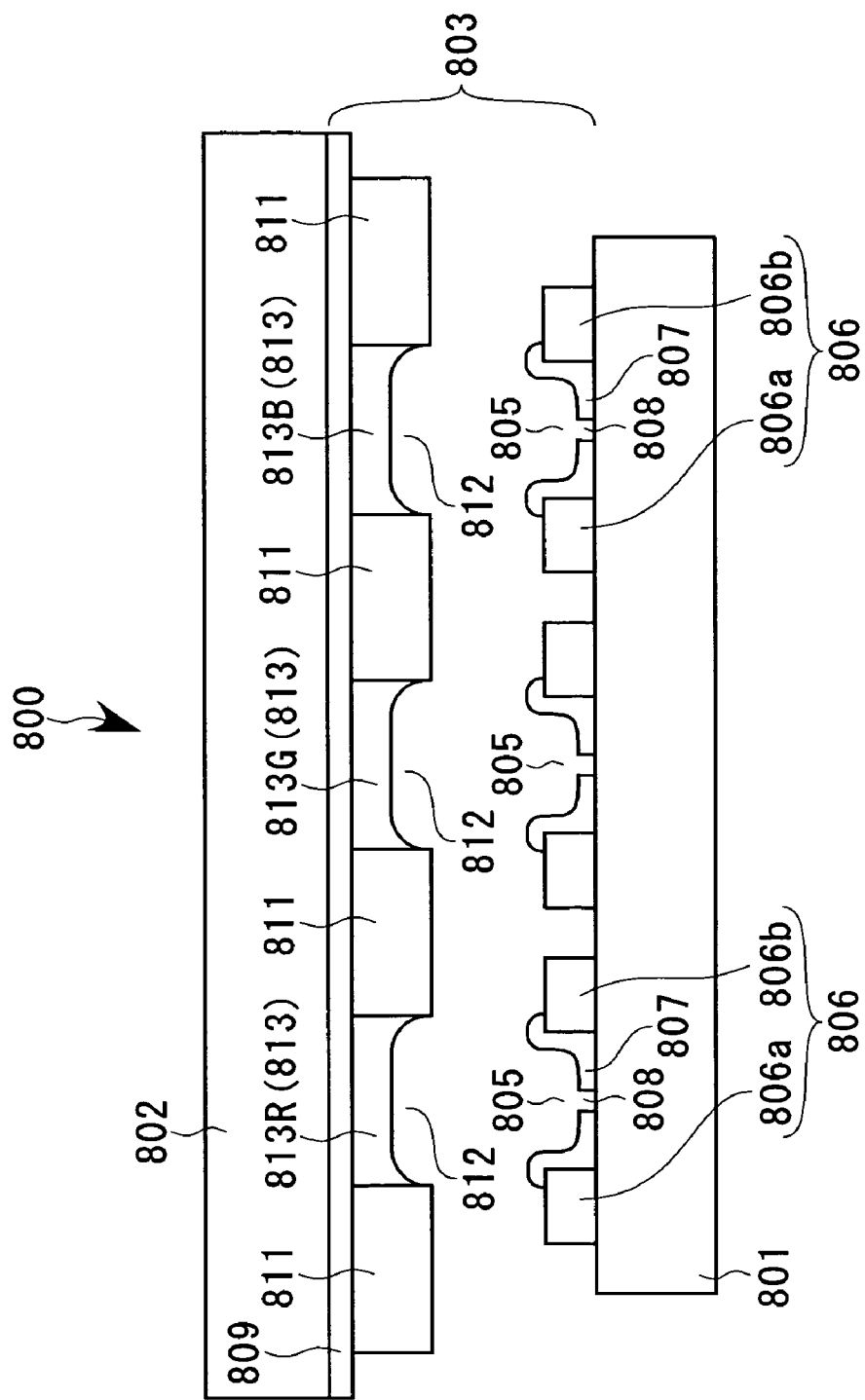
FIG. 26 is a sectional view illustrating an essential part of an electron emission display apparatus (FED apparatus).

FIG. 26 shows a sectional view of an essential part of an electron emission apparatus (also referred to as a FED apparatus or a SED apparatus: hereinafter simply referred to as a display apparatus 800). In FIG. 26, a part of the display apparatus 800 is shown in the sectional view.

The display apparatus 800 includes a first substrate 801, a second substrate 802 which faces the first substrate 801, and a field-emission display portion 803 interposed therebetween. The field-emission display portion 803 includes a plurality of electron emission portions 805 arranged in a matrix.

First element electrodes 806a and second element electrodes 806b, and conductive films 807 are arranged on the first substrate 801. The first element electrodes 806a and the second element electrodes 806b intersect with each other. Cathode electrodes 806 are formed on the first substrate 801, and each of the cathode electrodes 806 is constituted by one of the first element electrodes 806a and one of the second element electrodes 806b. In each of the cathode electrodes 806, one of the conductive films 807 having a gap 808 is formed in a portion formed by the first element electrode 806a and the second element electrode 806b. That is, the first element electrodes 806a, the second element electrodes 806b, and the conductive films 807 constitute the plurality of electron emission portions 805. Each of the conductive films 807 is constituted by palladium oxide (PdO). In each of the cathode electrodes 806, the gap 808 is formed by forming processing after the corresponding one of the conductive films 807 is formed.

An anode electrode 809 is formed on a lower surface of the second substrate 802 so as to face the cathode electrodes 806. A bank portion 811 is formed on a lower surface of the anode electrode 809 in a lattice. Fluorescent materials 813 are arranged in opening portions 812 which opens downward and which are surrounded by the bank portion 811. The fluorescent materials 813 correspond to the electron emission portions 805. Each of the fluorescent materials 813 emits fluorescent light having one of the three colors, red (R), green (G), and blue (B). Red fluorescent materials 813R, green fluorescent materials 813G, and blue fluorescent materials 813B are arranged in the opening portions 812 in a predetermined arrangement pattern described above.

The first substrate 801 and the second substrate 802 thus configured are attached with each other with a small gap therebetween. In this display apparatus 800, electrons emitted from the first element electrodes 806a or the second element electrodes 806b included in the cathode electrodes 806 hit the fluorescent materials 813 formed on the anode electrode 809 so that the fluorescent materials 813 are excited and emit light whereby display with colors is achieved.

As with the other embodiments, in this case also, the first element electrodes 806a, the second element electrodes 806b, the conductive films 807, and the anode electrode 809 may be formed using the liquid droplet ejection apparatus 1. In addition, the red fluorescent materials 813R, the green fluorescent materials 813G, and the blue fluorescent materials 813B may be formed using the liquid droplet ejection apparatus 1.

Figure 27A:
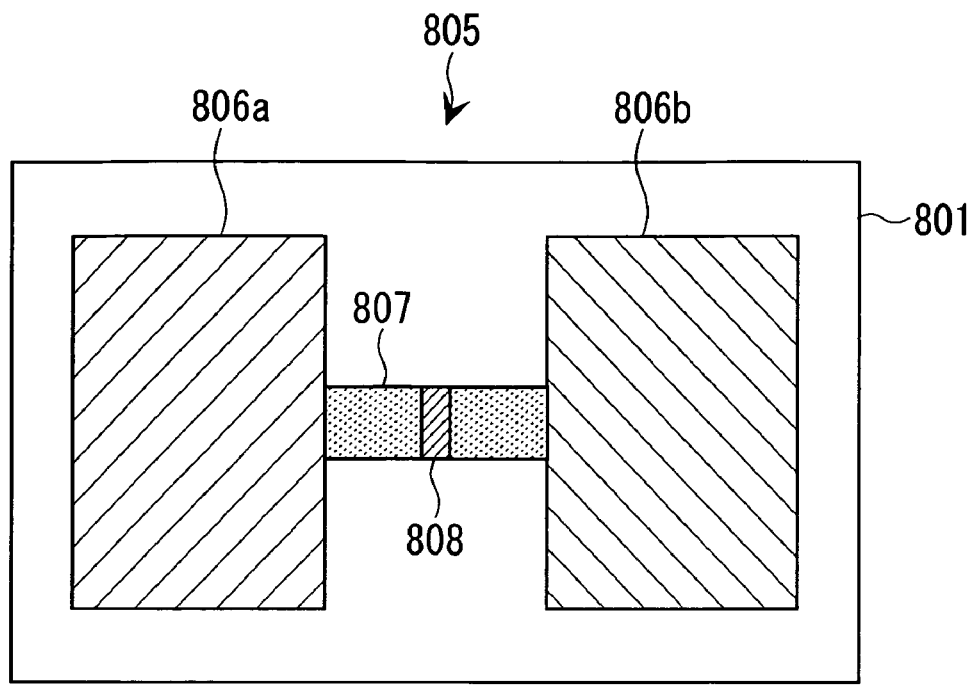
FIG. 27A is a plan view illustrating an electron emission portion and the vicinity thereof of a display apparatus.
Figure 27B:
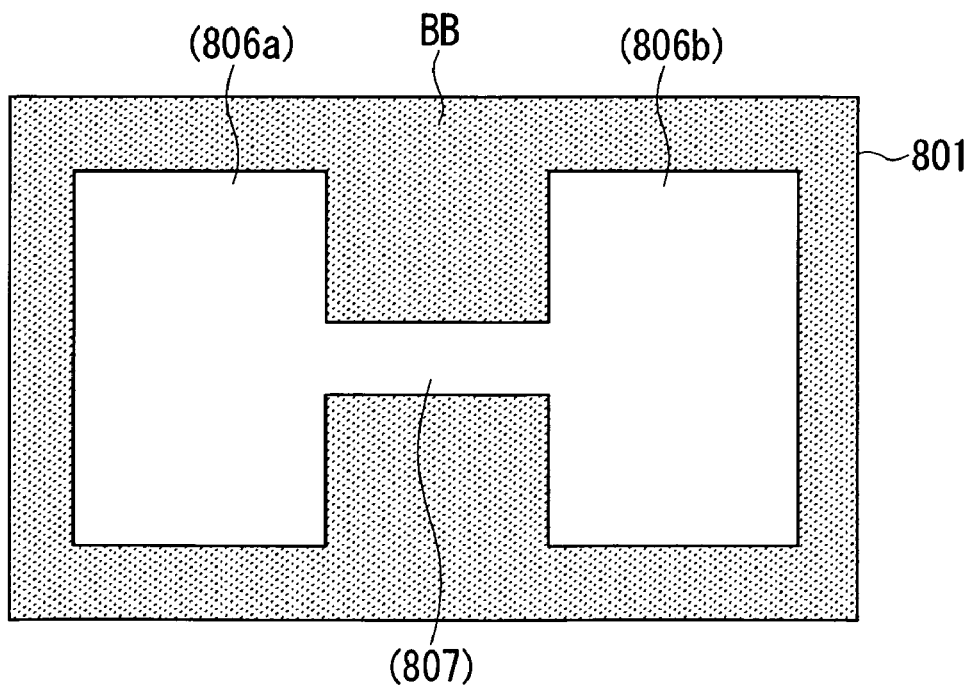
FIG. 27B is a plan view illustrating a method of forming the electron emission portion and the vicinity thereof.

Each of the first element electrodes 806a, each of the second element electrodes 806b, and each of the conductive films 807 have shapes as shown in FIG. 27A. When the first element electrodes 806a, the second element electrodes 806b, and the conductive films 807 are formed, portions for forming the first element electrodes 806a, the second element electrodes 806b, and the conductive films 807 are left as they are on the first substrate 801 and only bank portions BB are formed (by a photolithography method) as shown in FIG. 27B. Then, the first element electrodes 806a and the second element electrodes 806b are formed by an inkjet method using a solvent ejected from the liquid droplet ejection apparatus 1 in grooves defined by the bank portions BB and are formed by drying the solvent. Thereafter, the conductive films 807 are formed by the inkjet method using the liquid droplet ejection apparatus 1. After forming the conductive films 807, the bank portions BB are removed by ashing processing and the forming processing is performed. Note that, as with the case of the organic EL device, the hydrophilic treatment is preferably performed on the first substrate 801 and the second substrate 802 and the repellency treatment is preferably performed on the bank portion 811 and the bank portions BB.

Examples of other electro-optical apparatuses include an apparatus for forming metal wiring, an apparatus for forming a lens, an apparatus for forming a resist, and an apparatus for forming an optical diffusion body. Use of the liquid droplet ejection apparatus 1 makes it possible to efficiently manufacture various electro-optical apparatuses.

What is claimed is:

1. An inkjet type liquid droplet ejection apparatus which supplies functional liquid to a plurality of head units having one or more functional liquid droplet ejection heads, each of the head units is based on a supply unit, and which plots on a workpiece with the plurality of head units comprising:

a tank unit which supplies the functional liquid continuously to the plurality of head units from a new functional liquid tank which is switched from an old functional liquid tank;

a functional liquid supplying channel having a main channel of which upper stream side is connected to the tank unit, and a plurality of individual channels having same volume which is branched from the main channel by a branching unit and of which downstream side is connected to the plurality of head units;

a detecting device which detects whether a new functional liquid from the new functional liquid tank reaches to the branching unit; and a controller which controls the plurality of functional liquid droplet ejection heads individually, the controller controls each of the head units at a time of non-plotting operation after the detecting device detects that the new functional liquid reaches to the branching unit so that all the head units except one head unit having a maximum consumption amount of the functional liquid perform a forcible ejection to make consumption amounts of the functional liquid thereof equal to the maximum consumption amount of the functional liquid.

2. The liquid droplet ejection apparatus according to claim 1, wherein the old functional liquid tank and the new functional liquid tank are connected to the main channel via a tank channel switching device, the detecting device comprises a sensor which detects a switching of the tank channel switching device at a time of replacement of the old functional liquid tank with the new functional liquid tank and a timer which counts time frame from the switching detection by the sensor to the arriving of the new functional liquid to the branching unit.

3. The liquid droplet ejection apparatus according to claim 1, wherein the controller controls the plurality of head units individually based on a control table made by an experiment done in advance.

4. The liquid droplet ejection apparatus according to claim 1, wherein the controller has a rewriting device which rewrites data of the control table based on a plotting pattern on the workpiece.

5. The liquid droplet ejection apparatus according to claim 1, wherein each of the head units has a plurality of functional liquid droplet ejection heads, the apparatus further comprising a plurality of carriage units having each of the head units and a moving table moving the plurality of carriage units individually in a sub-scanning direction.

* * * * *